(12) United States Patent
Midorikawa

(10) Patent No.: US 11,353,825 B2
(45) Date of Patent: Jun. 7, 2022

(54) ENGAGEMENT PART, COOLING DEVICE, AND IMAGE FORMING APPARATUS

(71) Applicant: Ruki Midorikawa, Kanagawa (JP)

(72) Inventor: Ruki Midorikawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/076,354

(22) Filed: Oct. 21, 2020

(65) Prior Publication Data

US 2021/0149336 A1 May 20, 2021

(30) Foreign Application Priority Data

Nov. 19, 2019 (JP) .............................. JP2019-208475

(51) Int. Cl.
*G03G 21/00* (2006.01)
*F24F 13/00* (2006.01)
*F16B 5/00* (2006.01)
*G03G 21/20* (2006.01)
*G03G 21/16* (2006.01)
*F24F 13/02* (2006.01)

(52) U.S. Cl.
CPC ......... *G03G 21/206* (2013.01); *F16B 5/0012* (2013.01); *F24F 13/0245* (2013.01); *G03G 21/1647* (2013.01); *G03G 2221/1645* (2013.01)

(58) Field of Classification Search
CPC ........... G03G 15/6573; G03G 21/1647; G03G 21/206; G03G 2221/1645; F24F 7/06; F24F 13/0245; F16B 5/0036; F16B 5/0012; F16B 5/0032; F16B 5/004

USPC .................................................. 399/92, 405
See application file for complete search history.

(56) References Cited

U.S. PATENT DOCUMENTS 6,056,021 A * 5/2000 Iizuka .................... B21D 39/02
138/157
2008/0200111 A1 * 8/2008 Gibson ................. B21C 37/104
454/251
(Continued)

FOREIGN PATENT DOCUMENTS

DE 3330221 A1 * 3/1985 ........... E04B 1/6179
EP 0744506 A1 * 11/1996 ............ F16B 5/0036
(Continued)

*Primary Examiner* — Robert B Beatty
(74) *Attorney, Agent, or Firm* — Harness, Dickey & Pierce, P.L.C.

(57) ABSTRACT

A part includes a first member and a second member including an engagement portion engaging with an engagement protrusion of the first member and restricting separation of the first member in a predetermined direction with respect to the second member. The engagement portion includes: a facing portion facing the engagement protrusion from downstream in a separating direction of the first member with respect to the second member; a first coupling portion connected to one end of the facing portion and coupling a main body of the second member and the facing portion to each other; and a second coupling portion connected to the other end of the facing portion and coupling the main body and the facing portion to each other. The second coupling portion includes an escape portion in which the engagement protrusion is movable in the separating direction and an orthogonal direction to the separating direction.

14 Claims, 18 Drawing Sheets

(56) References Cited

U.S. PATENT DOCUMENTS

| | | | |
|---|---|---|---|
| 2014/0147153 A1* | 5/2014 | Murayama | G03G 21/1661 399/74 |
| 2015/0311632 A1 | 10/2015 | Ishikawa et al. | |
| 2017/0102667 A1* | 4/2017 | Yuan | G03G 21/1867 |
| 2018/0059601 A1* | 3/2018 | Abe | B65H 7/14 |
| 2019/0302690 A1 | 10/2019 | Midorikawa | |
| 2020/0218181 A1* | 7/2020 | Midorikawa | G03G 15/2021 |

FOREIGN PATENT DOCUMENTS

| | | | | |
|---|---|---|---|---|
| FR | 2761651 A1 | * | 10/1998 | F16B 5/0036 |
| JP | 2004-015929 A | | 1/2004 | |
| JP | 4418953 B2 | | 12/2009 | |
| JP | 2014078048 A | * | 5/2014 | |
| JP | 2015-210394 A | | 11/2015 | |

\* cited by examiner

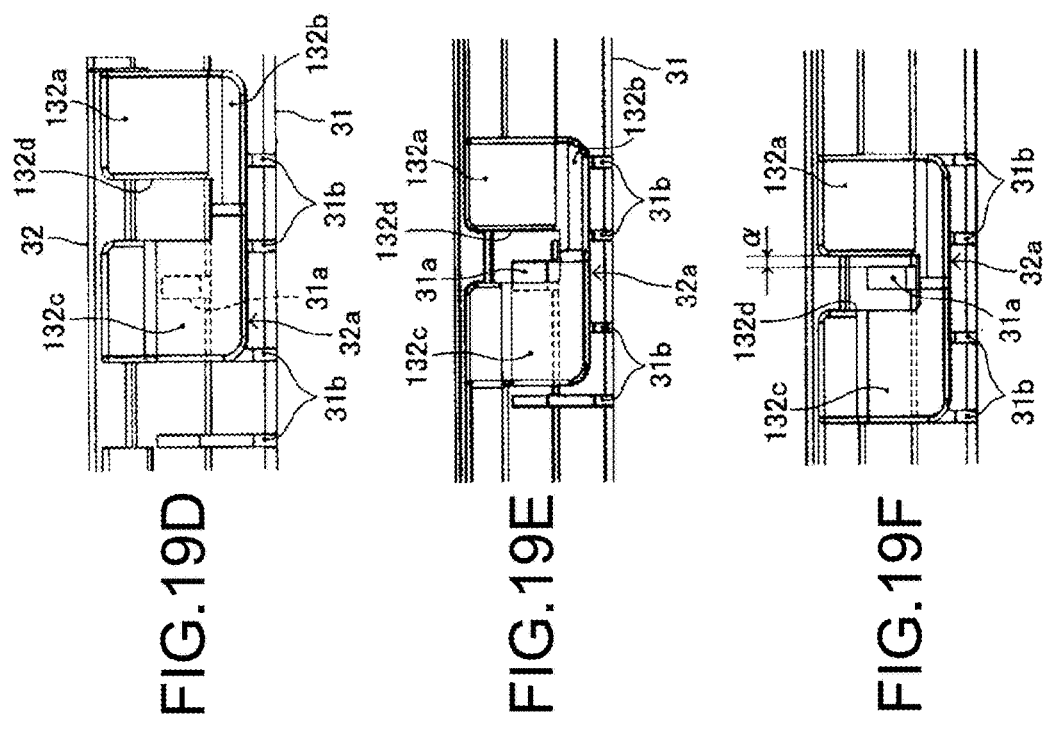
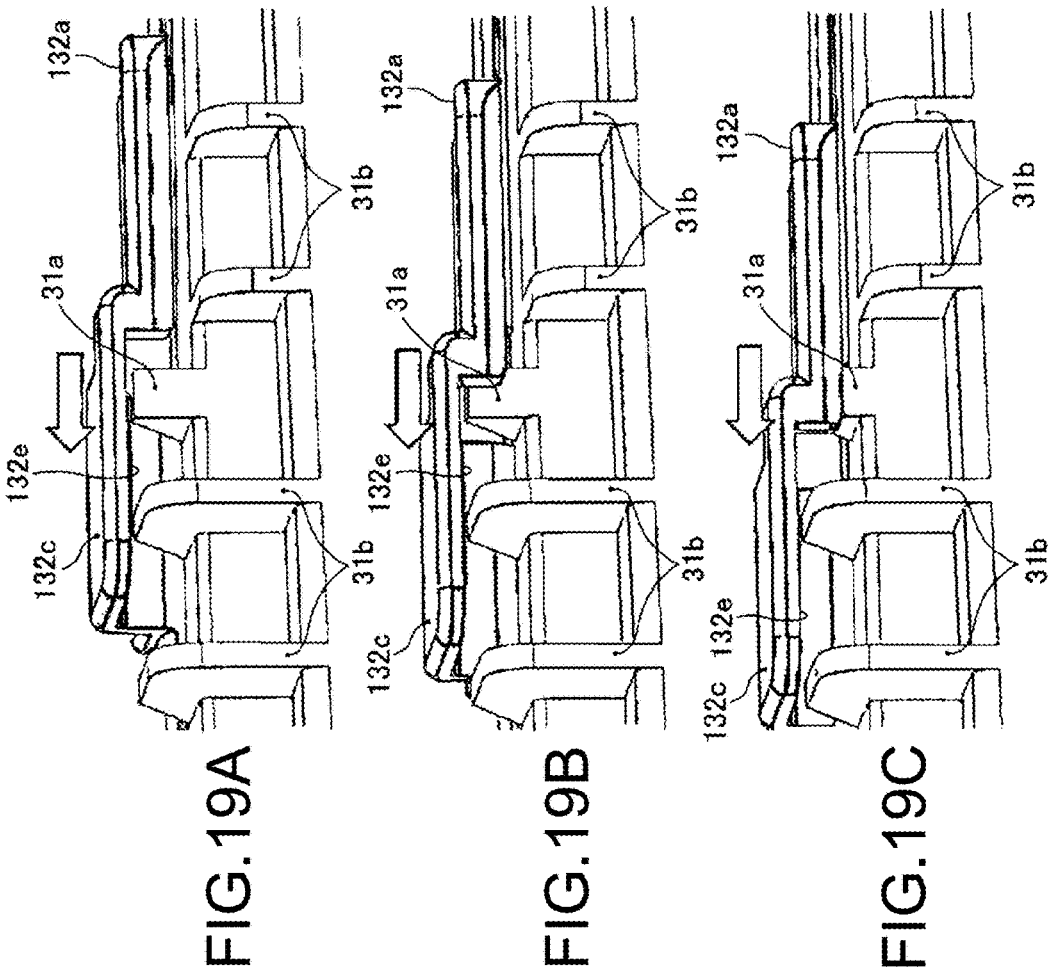

ENGAGEMENT PART, COOLING DEVICE, AND IMAGE FORMING APPARATUS

CROSS-REFERENCE TO RELATED APPLICATIONS

The present application claims priority under 35 U.S.C. § 119 to Japanese Patent Application No. 2019-208475, filed on Nov. 19, 2019. The contents of which are incorporated herein by reference in their entirety.

BACKGROUND OF THE INVENTION

1. Field of the Invention

The present invention relates to a part, a cooling device, and an image forming apparatus.

2. Description of the Related Art

Heretofore, a part has been known, which includes a first member and a second member, in which the second member has an engagement portion that engages with an engagement protrusion of the first member and restricts separation of the first member from the second member in a predetermined direction.

In Japanese Patent No. 4418953, as the above-mentioned part, one is described, in which an engagement protrusion is provided on a box body, a locking step portion as an engagement portion is provided on a lid body, and the locking step portion of the lid body gets over the engagement protrusion of the box body and engages both with each other.

However, there has been a possibility that the first member that is an elastically deformable member may be damaged by a stress, which is applied to the first member, when the engagement portion such as the locking step portion of the second member such as the lid body gets over the engagement protrusion of the first member such as the box body.

SUMMARY OF THE INVENTION

According to an aspect of the present invention, a part includes a first member and a second member. The second member includes an engagement portion engaging with an engagement protrusion of the first member and restricting separation of the first member in a predetermined direction with respect to the second member. The engagement portion includes a facing portion, a first coupling portion, and a second coupling portion. The facing portion faces the engagement protrusion from downstream in a separating direction of the first member with respect to the second member. The first coupling portion is connected to one end of the facing portion and couples a main body of the second member and the facing portion to each other. The second coupling portion is connected to the other end of the facing portion and couples the main body and the facing portion to each other. The second coupling portion includes an escape portion in which the engagement protrusion is movable in the separating direction and an orthogonal direction to the separating direction.

BRIEF DESCRIPTION OF THE DRAWINGS

FIGS. 19A to 19F are views illustrating a vicinity of the engagement portion when the first member is assembled to the second member;

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
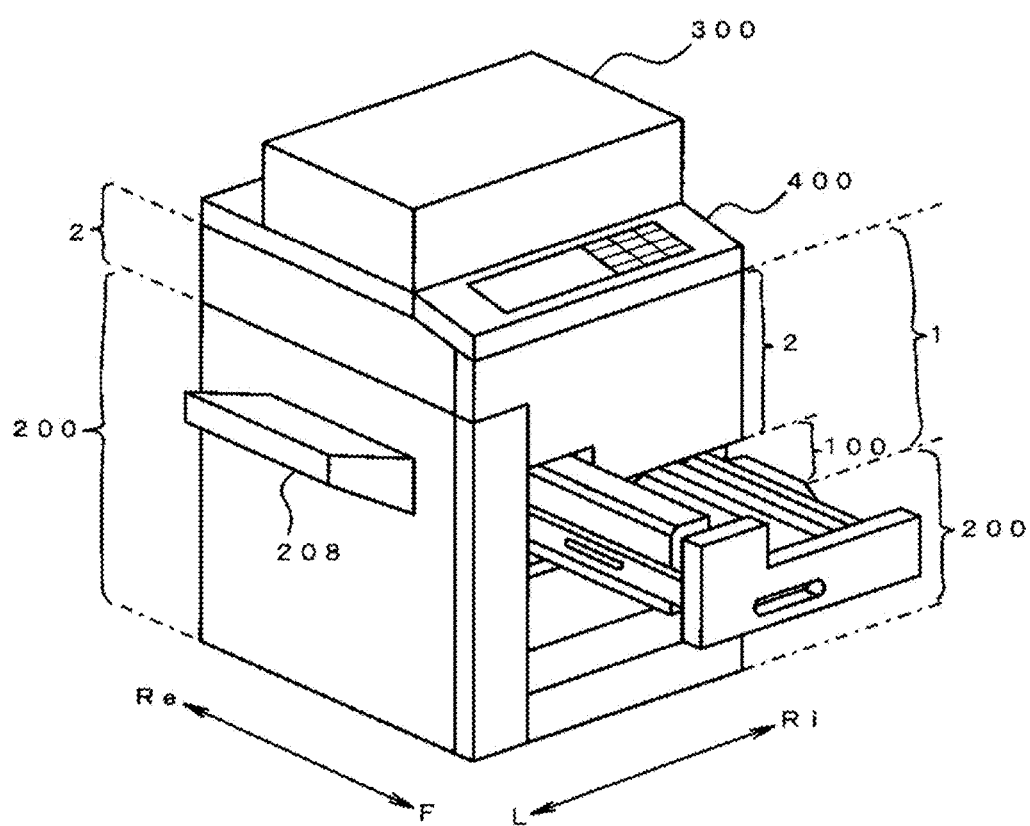
FIG. 1 is an external perspective view illustrating a copier according to an embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

A description will be given below of an embodiment in which the present invention is applied to a copier as an image forming apparatus.

First, a basic configuration of the copier according to the embodiment will be described. FIG. 1 is an external perspective view illustrating the copier according to the embodiment. This copier includes: a printer 1 that forms an image by an electrophotographic method; a paper feeding/ejecting device 200; a scanner 300 equipped with an automatic document feeder; and an operation display unit 400.

The printer 1 that forms an image on a sheet of paper as a sheet includes an image forming unit 2 and a sheet of paper conveying unit 100. As illustrated in the figure, the sheet of paper conveying unit 100 is configured to slide with respect to a main body including the image forming unit 2 of the printer 1 and to be pulled out from the main body.

In the figure, the copier is illustrated from a diagonally front left side. A direction of an arrow F in the figure indicates a direction toward a front side of the copier inside the copier. Moreover, a direction of an arrow Re indicates a direction toward a rear side of the copier inside the copier. Further, a direction of an arrow Ri indicates a direction toward a right side of the copier inside the copier. Furthermore, a direction of an arrow L indicates a direction toward a left side of the copier inside the copier.

Figure 2:
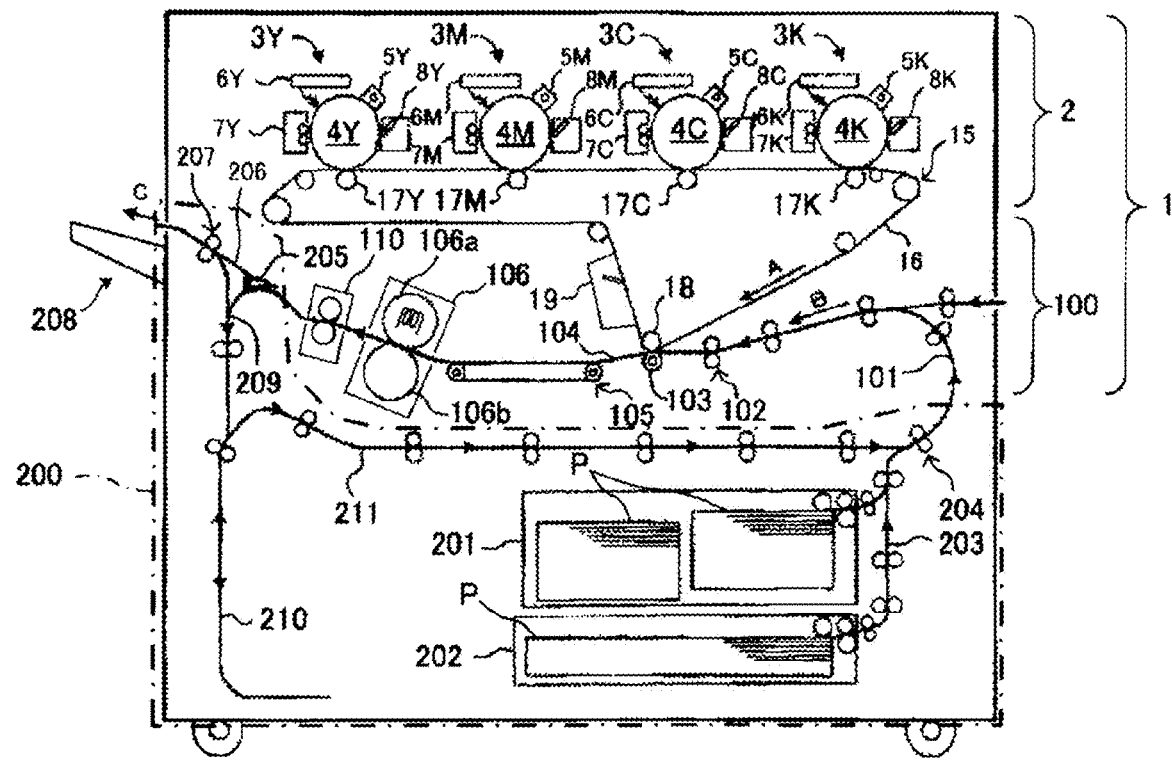
FIG. 2 is a configuration diagram illustrating an overview of an internal configuration of a printer and a paper feeding/ejecting device in the copier from a front side of the copier.

FIG. 2 is a configuration diagram illustrating an overview of an internal configuration of the printer 1 and the paper feeding/ejecting device 200 in the copier from the front side of the copier. The image forming unit 2 of the printer 1 includes image formation units 3Y, 3M, 3C and 3K for forming toner images of yellow (Y), magenta (M), cyan (C) and black (K), and these are arranged side by side at a predetermined pitch in a left-right direction of the copier. Note that subscripts Y, M, C and K added after numerical symbols indicate members and devices for Y, M, C and K.

Besides the image formation units 3Y, 3M, 3C and 3K for Y, M, C and K, the image forming unit 2 includes a transfer unit 15 disposed below these.

The Y, M, C, K image formation units 3Y, 3M, 3C and 3K have substantially the same configuration except that colors of toners used are different from one another. The configuration of the image formation units will be described below by taking the image formation unit 3Y for forming a Y toner image as an example.

The image formation unit 3Y for Y includes a drum-shaped photoconductor 4Y. Moreover, the image formation unit 3Y also includes a charger 5Y, an exposure device 6Y, a developing device 7Y, a drum cleaning device 8Y and the like, which are disposed around the photoconductor 4Y.

In the image formation unit 3Y, the photoconductor 4Y is rotationally driven in a counterclockwise direction in the figure, and at a position that faces the charger 5Y, a peripheral surface is uniformly charged by the charger 5Y with a high voltage to the same polarity as that of the toner. The surface of the photoconductor 4Y after being uniformly charged is optically scanned by the exposure device 6Y that emits laser light modulated based on image information. A surface location of the photoconductor 4Y, which is exposed by this optical scanning, attenuates a potential and carries an electrostatic latent image.

This electrostatic latent image is developed into a Y toner image in such a manner that Y toner is selectively attached thereon by the developing device 7Y. Following the rotation of the photoconductor 4Y, this Y toner image enters a primary transfer nip for Y, which is formed by abutment of the photoconductor 4Y and an intermediate transfer belt 16 to be described later.

While winding and tensioning the endless intermediate transfer belt 16 around a plurality of rollers disposed inside a loop thereof, the transfer unit 15 endlessly moves the intermediate transfer belt 16 in a direction of an arrow A by rotationally driving any one of the rollers.

Among the plurality of rollers disposed inside the loop of the intermediate transfer belt 16, a primary transfer roller 17Y for Y sandwiches the intermediate transfer belt 16 between the same and such a Y photoconductor 4Y. Thus, such a Y primary transfer nip is formed by the abutment of the Y photoconductor 4Y and an outer peripheral surface of the intermediate transfer belt 16.

A primary transfer bias having a polarity reverse to the charging polarity of the toner is applied to the Y primary transfer roller 17Y. Thus, a primary transfer electric field that electrostatically moves the Y toner image on the Y photoconductor 4Y from the photoconductor side toward the belt surface side is formed in the Y primary transfer nip. In the Y primary transfer nip, the Y toner image on the Y photoconductor 4Y is primarily transferred to the outer peripheral surface of the intermediate transfer belt 16 by actions of the primary transfer electric field and a pressure at the nip.

Transfer residual toner that has not been primarily transferred to the intermediate transfer belt 16 is attached to the surface of the photoconductor 4Y that has passed through the Y primary transfer nip. The transfer residual toner is removed from the surface of the photoconductor 4Y by the drum cleaning device 8Y.

In the M, C, K image formation units 3M, 3C and 3K, a M toner image, a C toner image and a K toner image are also formed on the surfaces of the photoconductors 4M, 4C and 4K by the same electrophotographic process as that of the Y image formation unit 3Y.

In the loop of the intermediate transfer belt 16, M, C, K primary transfer rollers 17M, 17C and 17K are disposed in addition to the Y primary transfer roller 17Y, and sandwich the intermediate transfer belt 16 between the same and the M, C, K photoconductors 4Y, 4M, 4C and 4K. Thus, M, C, K primary transfer nips are formed by abutment of the outer peripheral surface of the intermediate transfer belt 16 and the M, C, K photoconductors 4M, 4C and 4K.

Onto the Y toner image primarily transferred to the outer peripheral surface of the intermediate transfer belt 16, the M toner image, the C toner image, and the K toner image are primarily transferred in the M, C, K primary transfer nips while being sequentially superimposed on one another. Thus, a toner image in which four colors are superimposed on one another is formed on the outer peripheral surface of the intermediate transfer belt 16.

A secondary transfer roller 103 is disposed below the intermediate transfer belt 16, and sandwiches the intermediate transfer belt 16 between the same and a secondary transfer counter roller 18 disposed in the loop of the intermediate transfer belt 16. Thus, a secondary transfer nip is formed by abutment of the outer peripheral surface of the intermediate transfer belt 16 and the secondary transfer roller 103. In this secondary transfer nip, a secondary transfer electric field is formed between the secondary transfer counter roller 18 to which a secondary transfer bias having the same polarity as that of the charging polarity of the toner is applied and the secondary transfer roller 103 that is electrically grounded.

Such a four-color superimposed toner image formed on the outer peripheral surface of the intermediate transfer belt 16 enters the secondary transfer nip following the endless movement of the intermediate transfer belt 16.

The paper feeding/ejecting device 200 of the copier includes a paper feeding bank 201 and a paper feeding cassette 202 below the sheet of paper conveying unit 100 of the printer 1. Then, the sheet of paper P fed out from the paper feeding bank 201 or the paper feeding cassette 202 into a supply conveyance path 203 is conveyed upward by a plurality of conveyance roller pairs disposed along the supply conveyance path 203. Then, the sheet of paper P is delivered into a paper feeding path 101 of the sheet of paper conveying unit 100 of the printer 1 by a delivery roller pair 204 provided near the terminal end of the supply conveyance path 203.

The sheet of paper P delivered from the supply conveyance path 203 to the paper feeding path 101 is conveyed by a plurality of conveyance roller pairs disposed along the paper feeding path 101, and abuts against a registration nip of a registration roller pair 102 disposed near the terminal end of the paper feeding path 101, whereby a skew of the sheet of paper P is adjusted. Thereafter, the registration roller pair 102 is rotationally driven, whereby the sheet of paper P is fed out toward the secondary transfer nip at a timing synchronized with the four-color superimposed toner image on the intermediate transfer belt 16.

The four-color superimposed toner image is secondarily transferred to the sheet of paper P, which is brought into close contact with the four-color superimposed toner image on the intermediate transfer belt 16 at the secondary transfer nip, by actions of the secondary transfer electric field and such a nip pressure. Thus, a full-color image is formed on the white sheet of paper P.

Transfer residual toner that has not been secondarily transferred to the sheet of paper P is attached to the outer peripheral surface of the intermediate transfer belt 16 that has passed through the secondary transfer nip. The transfer residual toner is removed from the intermediate transfer belt 16 by a belt cleaning device 19.

The sheet of paper conveying unit 100 of the printer 1 includes a post-transfer conveyance path 104, a sheet of paper conveyance belt unit 105, a fixing device 106, a conveyance cooling unit 110, and the like in addition to the paper feeding path 101, the registration roller pair 102, and the secondary transfer roller 103.

The sheet of paper P that has passed through the secondary transfer nip is fed out to the post-transfer conveyance path 104. The post-transfer conveyance path 104 passes through the sheet of paper conveyance belt unit 105, the fixing device 106, and the conveyance cooling unit 110.

The sheet of paper P fed out to the post-transfer conveyance path 104 is first conveyed by a sheet of paper conveyance belt unit 105 from the right side of the copier to the left side thereof, and is then fed into the fixing device 106.

The fixing device 106 forms a fixing nip by abutment of a fixing roller 106a including a heat source such as a halogen lamp and a pressure roller 106b pressed against the fixing roller 106a. The sheet of paper P fed into the fixing device 106 enters the fixing nip and is heated and pressed. Thus, a full-color image is fixed on the surface of the sheet of paper P.

The sheet of paper P that has passed through the fixing device 106 passes through the conveyance cooling unit 110, and is then fed into the left end portion of the paper feeding/ejecting device 200.

A switching claw 205, a paper ejection path 206, a paper ejection roller pair 207, a return path 209, a switchback path 210, and the like are disposed at the left end portion of the paper feeding/ejecting device 200 Moreover, a resupply path 211 is disposed above the paper feeding bank 201 in the paper feeding/ejecting device 200.

The switching claw 205 selects a subsequent conveyance destination of the sheet of paper P delivered from the conveyance cooling unit 110 of the sheet of paper conveying unit 100 of the printer 1 to the left end portion of the paper feeding/ejecting device 200. At the time of ending a single-sided mode of forming an image on only one side of the sheet of paper P or ending double-sided printing in a double-sided mode of forming images on both sides of the sheet of paper P, the paper ejection path 206 is selected as the conveyance destination of the sheet of paper P. The sheet of paper P fed into the paper ejection path 206 passes through the paper ejection roller pair 207, is then ejected to the outside of the machine, and is stacked on a stack tray 208.

On the other hand, at the time of ending the single-sided printing in the double-sided mode, the return path 209 is selected as the conveyance destination of the sheet of paper P. The sheet of paper P fed into the return path 209 enters the switchback path 210, is then turned upside down by the switchback, and is fed into the resupply path 211. Then, after passing through the resupply path 211, the sheet of paper P is fed again to the paper feeding path 101. Thereafter, after a full-color image is also secondarily transferred to the other surface of the sheet of paper P at the secondary transfer nip, the sheet of paper P sequentially passes through the fixing device 106, the conveyance cooling unit 110, the paper ejection path 206, and the paper ejection roller pair 207, and is then discharged to the outside of the machine.

The sheet of paper P that has passed through the fixing device 106 has a high temperature. In recent years when the printing speed has been increased, if the sheet of paper P is conveyed at high temperature, then an image surface of the sheet of paper P is likely to have streaks and scratches due to loads from such guide members or roller marks due to conveyance, or is likely to cause a blocking phenomenon in which such sheets of paper P stick to each other.

The conveyance cooling unit 110 cools the sheet of paper P fed out from the fixing device 106 while conveying the same.

Figure 3:
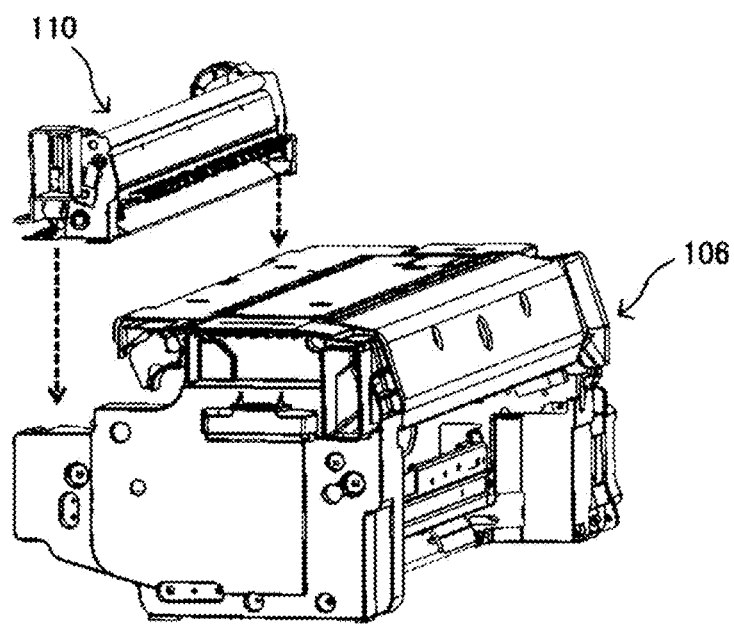
FIG. 3 is a perspective view illustrating a fixing device and a conveyance cooling unit.

FIG. 3 is a perspective view illustrating the fixing device 106 and the conveyance cooling unit 110. As indicated by arrows in the figure, the conveyance cooling unit 110 is attached to the fixing device 106 so that the sheet of paper that has just been discharged from the fixing device 106 can be cooled while being conveyed.

Figure 4:
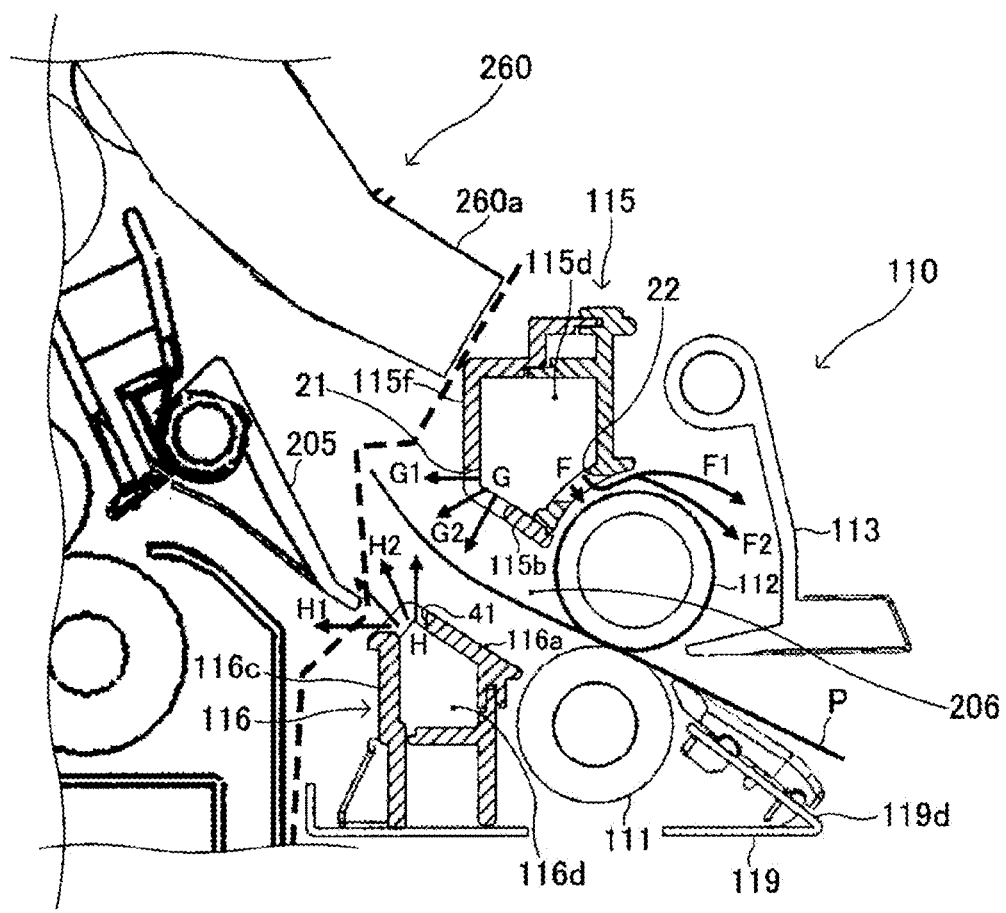
FIG. 4 is a cross-sectional view illustrating the conveyance cooling unit together with a sheet of paper being conveyed.

FIG. 4 is a cross-sectional view illustrating the conveyance cooling unit 110 together with the sheet of paper P being conveyed. The conveyance cooling unit 110 forms a conveyance nip by abutment of a drive roller 111 that is rotationally driven and a driven roller 112 that is pressed by the drive roller 111, and imparts a conveying force to the sheet of paper P sandwiched in the conveyance nip.

Moreover, the conveyance cooling unit 110 also includes an upper nip guide member 113, a lower nip guide member 119d provided on a sheet metal frame 119, an upper air duct 115, a lower air duct 116, and the like. The sheet of paper P that has just been fed out from the fixing device 106 is passed between the upper nip guide member 113 and the lower nip guide member 119d and is guided toward the above-mentioned conveyance nip.

The upper air duct 115 as a duct is provided with a plurality of upper conveyance path blower outlets 21 which blow air toward the paper ejection path 206 that is a sheet of paper conveyance path and with a plurality of roller blower outlets 22 which face the driven roller 112 that is a conveyance roller and blow air toward the driven roller 112. The upper conveyance path blower outlets 21 and the roller blower outlets 22 are provided at predetermined intervals in a width direction of the sheet of paper (this width direction will also be referred to as an axial direction of the driven roller and a duct longitudinal direction).

Moreover, the lower air duct 116 as a second duct is provided with lower conveyance path blower outlets 41 which blow air toward the paper ejection path 206.

As indicated by arrows G in the figure, cooling air sent to an upper air path 115d of the upper air duct 115 is blown from the upper conveyance path blower outlets 21 to the upper surface of the sheet of paper P that has passed through the conveyance nip. Moreover, as indicated by arrows H in the figure, cooling air sent to a lower air path 116d of the lower air duct 116 is blown from the lower conveyance path blower outlets 41 to the upper surface of the sheet of paper P that has passed through the conveyance nip. Thus, the sheet of paper P heated by the fixing device (106) is cooled from both sides thereof.

The sheet of paper P on which the image is fixed by the fixing device 106 is conveyed to the conveyance nip between the driven roller 112 and the drive roller 111 in a high temperature state. In this conveyance nip, heat of the sheet of paper P is delivered to the driven roller 112 and the drive roller 111, and the temperature of the driven roller 112 and the drive roller 111 rises. When such sheets of paper are continuously fed, the heat is exchanged from the sheets of paper to a pair of the rollers since a roller temperature is lower than a temperature of the sheets of paper at an initial stage. Meanwhile, the sheet of paper P nipped by the pair of rollers of which temperature has gradually risen is not subjected to the heat exchange, and is conveyed downstream with the temperature thereof kept high. As a result, such a sheet-of-paper temperature may not be lowered to a target temperature by cooling by blowing air from the upper air duct 115 and the lower air duct 116, which may cause the blocking phenomenon in which the sheets of paper P stick to each other.

Moreover, when the sheets of paper are continuously fed, the surface temperature of the driven roller 112 and the drive roller 111 may rise to a temperature close to a toner melting point, and when the surface temperature of the rollers rises to the temperature close to the toner melting point, the toner on the sheets of paper may adhere to the surfaces of the rollers. When the toner adheres to the surfaces of the rollers in this way, each of the conveyed sheets of paper becomes likely to stick to either of the rollers, the sheet of paper is wound around the roller along the outer diameter of the roller to cause a conveyance failure, which may result in an occurrence of a paper jam in the device. In particular, the driven roller 112 abuts against the surface of the sheet of the paper, against which the fixing roller that heats the sheet of paper abuts, and therefore, the temperature thereof is more likely to rise more than that of the drive roller 111. Furthermore, since the toner image that has just been fixed contacts the driven roller 112, toner adhesion is also likely to occur.

However, in the present embodiment, as indicated by arrows F in the figure, cooling air is blown toward the driven roller 112 at a short distance directly from the roller blower outlets 22 which are provided in the upper air duct 115 and face the driven roller 112, whereby an effect of always cooling the roller can be obtained. Thus, the driven roller 112 is cooled simultaneously when the temperature of the driven roller 112 rises since the sheet of paper is fed therethrough, and the temperature rise of the driven roller 112 is suppressed. Thus, the toner can be inhibited from adhering to the driven roller 112, and the conveyed sheet of paper can be inhibited from being wound around the driven roller 112.

Moreover, when the sheet of paper is not fed, the heat of the drive roller 111 moves to the driven roller 112, and the temperature rise of the drive roller 111 is suppressed. Furthermore, the driven roller 112 is cooled simultaneously when the heat of the drive roller 111 moves to the driven roller 112 and the temperature rise of the driven roller 112 occurs. Thus, the temperature rise of the drive roller 111 is also suppressed, such toner adhesion to the surface of the drive roller 111 can also be suppressed, and the conveyed sheet of paper can be inhibited from being wound around the driven roller 112.

Furthermore, since the temperature rise of the driven roller 112 and the drive roller 111 can be suppressed, the heat is exchanged with the sheet of paper P satisfactorily at the conveyance nip, and the temperature of the sheet of paper P can be lowered. Thus, the sheet-of-paper temperature can be lowered satisfactorily to the target temperature by the cooling by blowing air from the upper air duct 115 and the lower air duct 116, and the blocking phenomenon in which the sheets of paper P stick to each other can be inhibited from occurring.

A metal roller can be used as the driven roller 112. When the driven roller 112 is made of metal, the roller temperature tends to increase because thermal conductivity of metal is higher than that of a rubber member. Hence, such a configuration of directly air-cooling the driven roller 112 is adopted as in the present embodiment, the temperature rise of the driven roller 112 can be effectively suppressed, a heat exchange property thereof with the sheet of paper P can be improved, and the sheet of paper P can be satisfactorily cooled at the conveyance nip.

Moreover, the driven roller 112 may be formed by tubing, on a surface, a hollow film material or the like, which is a material to which the toner is hard to adhere. Furthermore, it is preferable that the surface of the driven roller 112 be made conductive. The surface of the driven roller 112 is made conductive, whereby an effect of suppressing charging of the roller is obtained.

Moreover, the driven roller 112 may have a configuration, for example, in which an outer shape of a cored bar is covered with a rubber member such as silicon, and further, tubed by using a material such as PFA to which the toner is hard to adhere. At this time, it is preferable to adopt a method of grounding static electricity, which is generated when the sheet of paper is fed, by making the rubber member conductive. Thus, the charging of the roller can be prevented. Moreover, such a material as PTFE, to which the toner becomes hard to adhere, is contained in the rubber member or is coated on the surface thereof, whereby a configuration in which the tubing of the PFA or the like is omitted can be adopted.

Furthermore, in the present embodiment, even when the sheet of paper P is not present in the conveyance cooling unit 110, the cooling air is continuously blown from the upper conveyance path blower outlets 21, the roller blower outlets 22, and the lower conveyance path blower outlets 41. Thus, the temperature rise of the driven roller 112 can be effectively suppressed. Moreover, even when the sheet of paper P is not present in the conveyance cooling unit 110, the cooling air is continuously blown from the upper conveyance path blower outlets 21 and the lower conveyance path blower outlets 41, whereby the air blown from the upper conveyance path blower outlets 21 flows to a paper ejection portion 260 on the left side of a broken line in the figure, and the paper ejection portion 260 can be cooled.

The upper conveyance path blower outlets 21 are provided downstream of an upper sheet-of-paper guide surface portion 115b of the upper air duct 115 in a sheet-of-paper conveyance direction (hereinafter, also simply referred to as a conveyance direction), the upper sheet-of-paper guide surface portion 115b facing the upper surface of the sheet of paper P conveyed in the paper ejection path 206. Moreover, the upper conveyance path blower outlets 21 extend to a downstream end portion, and further, are extended to a lower side of a downstream sidewall portion 115f on a downstream side in the conveyance direction of the upper air duct 115. Thus, downstream ends of the upper conveyance path blower outlets 21 in the conveyance direction are located at positions retracted from the paper ejection path 206 with respect to the upper sheet-of-paper guide surface portion 115b. As a result, a leading end of the conveyed sheet of paper can be prevented from being caught at the downstream end of the upper conveyance path blower outlets 21 in the conveyance direction, and folds and conveyance failures can be inhibited from occurring.

Moreover, the upper conveyance path blower outlets 21 are extended to the lower side of the downstream sidewall portion 115f, whereby the cooling air can be blown toward the paper ejection portion 260 on the left side of the broken line in the figure (arrow G1 in the figure) in addition to the lower air duct 116 (arrow G2 in the figure). Thus, the cooling air can be blown onto the upper surface of the sheet of paper in a wide range, and the temperature of the sheet of paper P can be satisfactorily lowered.

Moreover, the cooling air can be blown toward the paper ejection portion 260 (arrow G1 in the figure), and accordingly, when the paper is not fed, the cooling air can be satisfactorily flown to the paper ejection portion 260, and the temperature rise of the paper ejection portion 260 can be suppressed.

Furthermore, like the upper conveyance path blower outlets 21, the lower conveyance path blower outlets 41 are also provided downstream in a conveyance direction of a lower sheet-of-paper guide surface portion 116a of the lower air duct 116, which faces the lower surface of the sheet of paper P conveyed in the paper ejection path 206, extend to a downstream end portion of the lower sheet-of-paper guide surface portion 116a, and further, are extended to an upper side of a downstream sidewall portion 116c of the lower air duct 116. Thus, downstream ends of the lower conveyance path blower outlets 41 are located at positions retracted from the paper ejection path 206 with respect to the lower sheet-of-paper guide surface portion 116a. Therefore, the leading end of the conveyed sheet of paper can be prevented from being caught at the downstream end of the lower conveyance path blower outlets 41 in the conveyance direction, and the folds and the conveyance failures can be inhibited from occurring.

Moreover, the lower conveyance path blower outlets 41 are extended to the upper side of the downstream sidewall portion 116c, whereby the cooling air can be blown toward the paper ejection portion 260 on the left side of the broken line in the figure (arrow H1 in the figure) in addition to the paper ejection path 206 (arrow H2 in the figure). Thus, a part of the cooling air blown out from the lower conveyance path blower outlets 41 can be flown to the paper ejection portion 260, and the paper ejection portion 260 can be cooled satisfactorily.

Moreover, in the present embodiment, as indicated by an arrow F1 in FIG. 4, among the cooling air blown out from the roller blower outlets 22, cooling air that flows along the surface of the driven roller 112 and goes toward the upstream side in the conveyance direction can be blocked by the upper nip guide member 113. Thus, the cooling air blown out from the roller blower outlets 22 can be inhibited from flowing to the fixing device 106, a temperature decrease of the fixing device 106 (fixing roller 106a) can be suppressed, and an occurrence of a fixing failure can be suppressed.

Next, a configuration of the conveyance cooling unit 110 of the present embodiment will be specifically described.

Figure 5:
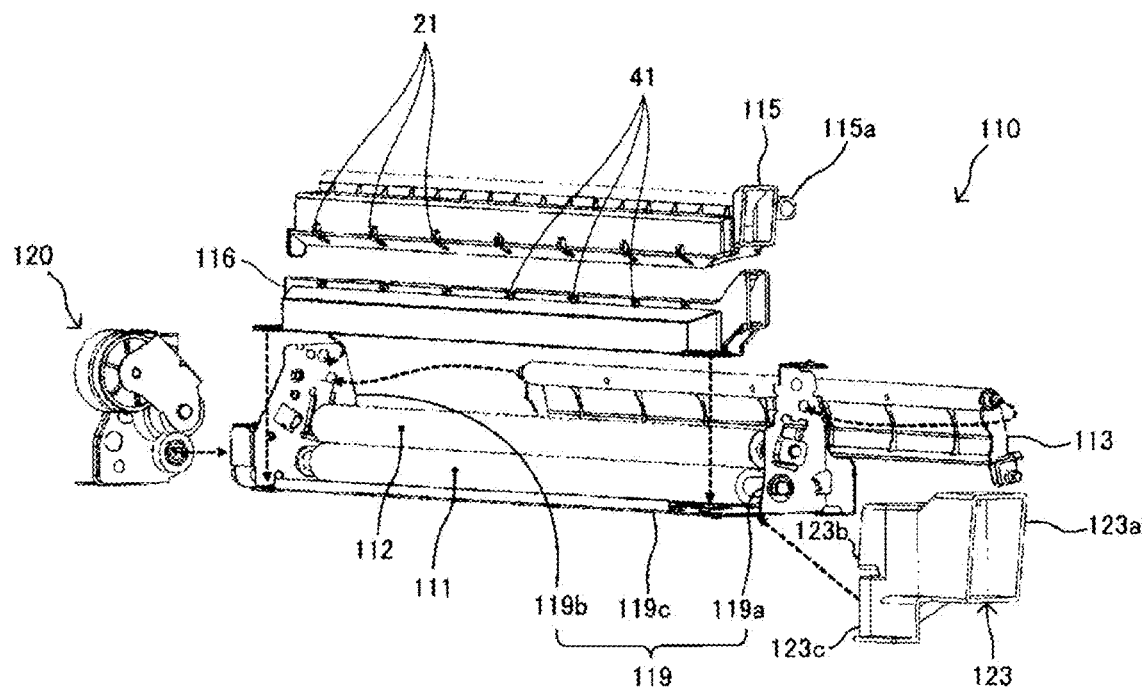
FIG. 5 is an exploded perspective view of the conveyance cooling unit.

FIG. 5 is an exploded perspective view of the conveyance cooling unit 110. The sheet metal frame 119 of the conveyance cooling unit 110 includes a front side plate 119a, a rear side plate 119b, and a bottom plate 119c. Note that the lower nip guide member (119d in FIG. 4) mentioned above is also integrally formed with the sheet metal frame 119.

The lower air duct 116 is fixed to an upper surface of the bottom plate 119c of the sheet metal frame 119. The upper air duct 115 is rotatably supported by the front side plate 119a and the rear side plate 119b in a state in which support shafts 117 and 125 (see FIGS. 7A and 7B) are inserted into through holes of support portions 115a provided at both end portions in a longitudinal direction thereof. The upper conveyance path blower outlets 21 are provided in plural at predetermined intervals in the longitudinal direction of the duct (also an axial direction of the driven roller 112, a width direction of the sheet of paper, and a front-rear direction of the device). Likewise, the lower conveyance path blower outlets 41 are also provided in plural at predetermined intervals in such a duct longitudinal direction.

The drive roller 111 and the driven roller 112 are rotatably received by a bearing provided on the front side plate 119a and a bearing provided on the rear side plate 119b. A drive transmission mechanism 120 for transmitting a driving force to the drive roller 111 is fixed to a back surface of the rear side plate 119b of the sheet metal frame 119. Moreover, a communication pipe 123 is fixed to a downstream end portion of the front side plate 119a of the sheet metal frame 119 in the conveyance direction.

The communication pipe 123 includes: a receiving portion 123a into which the cooling air taken in from outside the device flows; a first communication portion 123b that communicates with the upper air duct 115 and sends the cooling air to the upper air duct 115; and a second communication portion 123c that communicates with the lower air duct 116 and sends the cooling air to the lower air duct 116.

Figure 6:
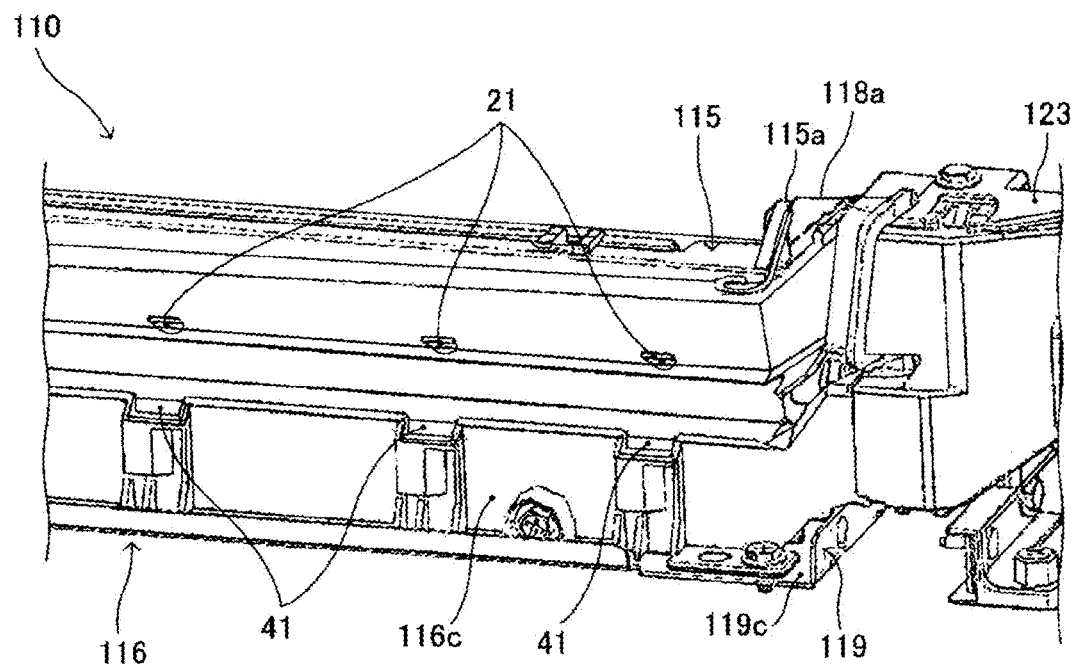
FIG. 6 is an enlarged perspective view of a main portion of the conveyance cooling unit.

FIG. 6 is an enlarged perspective view of a main portion of the conveyance cooling unit 110.

As illustrated in FIG. 6, the lower conveyance path blower outlets 41 of the lower air duct 116 and the upper conveyance path blower outlets 21 of the upper air duct 115 are provided at the same positions in a sheet-of-paper width direction.

Moreover, the upper air duct 115 is urged to the lower air duct 116 side by a torsion spring 118a.

Figure 7A:
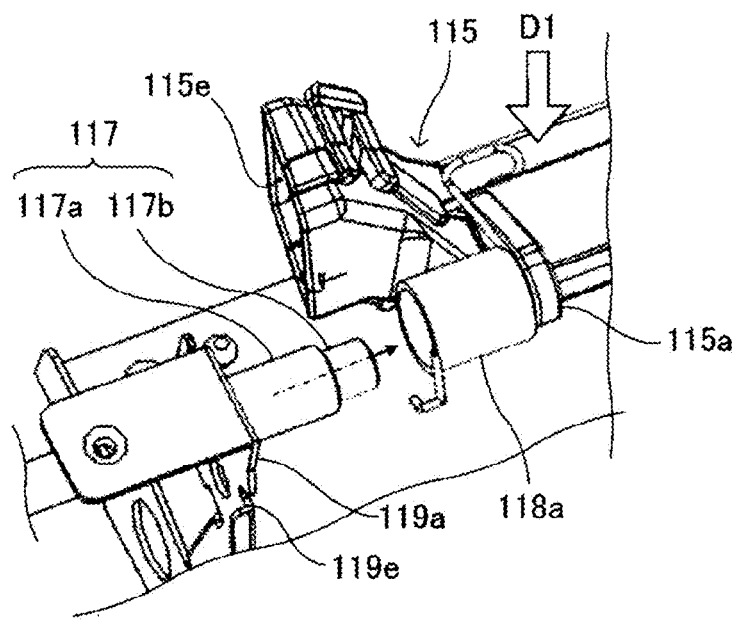
FIG. 7A is a partial perspective view partially illustrating a front side plate and a periphery thereof.
Figure 7B:
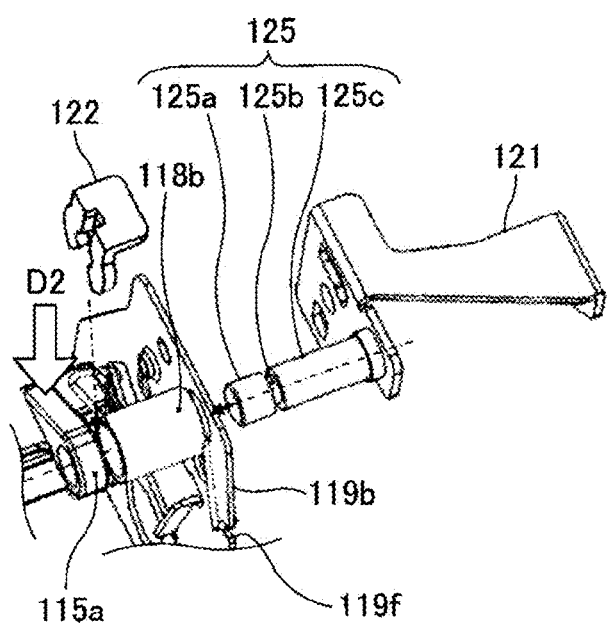
FIG. 7B is a partial perspective view partially illustrating a rear side plate and a periphery thereof.

FIG. 7A is a partial perspective view partially illustrating the front side plate 119a and a periphery thereof, and FIG. 7B is a partial perspective view partially illustrating the rear side plate 119b and a periphery thereof.

As illustrated in FIG. 7A, the front side plate 119a is provided with the front side support shaft 117 by which the support portion 115a of the upper air duct 115 is supported. The front side support shaft 117 includes: a spring support portion 117a into which the front side torsion spring 118a as an urging unit is inserted; and a duct support portion 117b smaller in diameter than the spring support portion 117a, the duct support portion 117b having the front support portion 115a of the upper air duct 115 inserted thereinto.

One end of the front side torsion spring 118a is hooked on a front side spring hooking portion 119e provided on the front side plate 119a, and the other end thereof abuts against the upper air duct 115 to urge the upper air duct 115 in a direction of an arrow D1 in the figure. Such an arrow D1 direction is a direction toward the lower air duct 116.

As illustrated in FIG. 7B, a duct support member 121 that rotatably supports the upper air duct 115 is fastened to the rear side plate 119b. The duct support member 121 is provided with a rear side support shaft 125. In order from a root side, the rear side support shaft 125 includes: a spring support portion 125c into which a rear side torsion spring 118b is inserted; a groove portion 125b onto which a collar 122 is fitted; and a duct support portion 125a into which the support portion 115a on the rear side of the upper air duct 115 is inserted.

One end of the rear side torsion spring 118b is hooked on a rear side spring hooking portion 119f provided on the rear side plate 119b, and the other end thereof abuts against the upper air duct 115 to urge the rear side of the upper air duct 115 in a direction of an arrow D2 in the figure. Such an arrow D2 direction is a direction toward the lower air duct 116.

Moreover, the collar 122 is fitted onto the rear side support shaft 125 between the rear side torsion spring 118b and the support portion 115a on the rear side of the upper air duct 115, whereby the movement of the upper air duct 115 in the front-rear direction is restricted, and the upper air duct 115 can be prevented from falling off the front side support shaft 117 and the rear side support shaft 125.

As described above, in the present embodiment, the respective support portions 115a provided on both sides in the front-rear direction (duct longitudinal direction) of the upper air duct 115 are inserted into the support shafts 117 and 125, whereby the upper air duct 115 is supported rotatably about the support shafts 117 and 125 which are taken as rotating shafts. Thus, the upper air duct 115 can move between a facing position (a position shown in FIG. 4) that faces the paper ejection path 206 and a retracted position retracted from the facing position.

Moreover, in the present embodiment, each of both end portions of the upper air duct 115 in the duct longitudinal direction (the front-rear direction of the device) is urged to the lower air duct 116 side (so that the upper air duct 115 is located at the facing position). Thus, when the sheet of paper P comes into contact with the upper air duct 115 when the sheet of paper is fed, rattling in a direction in which the upper air duct 115 is moved away from the lower air duct 116 can be prevented by the conveying force of the sheet of paper P.

Note that, in the present embodiment, the torsion spring is used as the urging unit for urging the upper air duct 115 to the facing position side; however, a tension spring or the like may be used as the urging unit. Further, in the present embodiment, though both ends of the upper air duct 115 in the duct longitudinal direction are urged by the urging unit, this is merely an example, and depending on the strength of the duct, one side thereof or to the center thereof in the duct longitudinal direction may be urged.

Moreover, in the present embodiment, the support shaft 117 is provided on the front side plate 119a, and the duct support member 121 is fastened to the rear side plate 119b; however, such a configuration may be adopted, in which the support shaft 117 is provided on the rear side plate 119b, and the duct support member 121 is fastened to the front side plate 119a.

Figure 8:
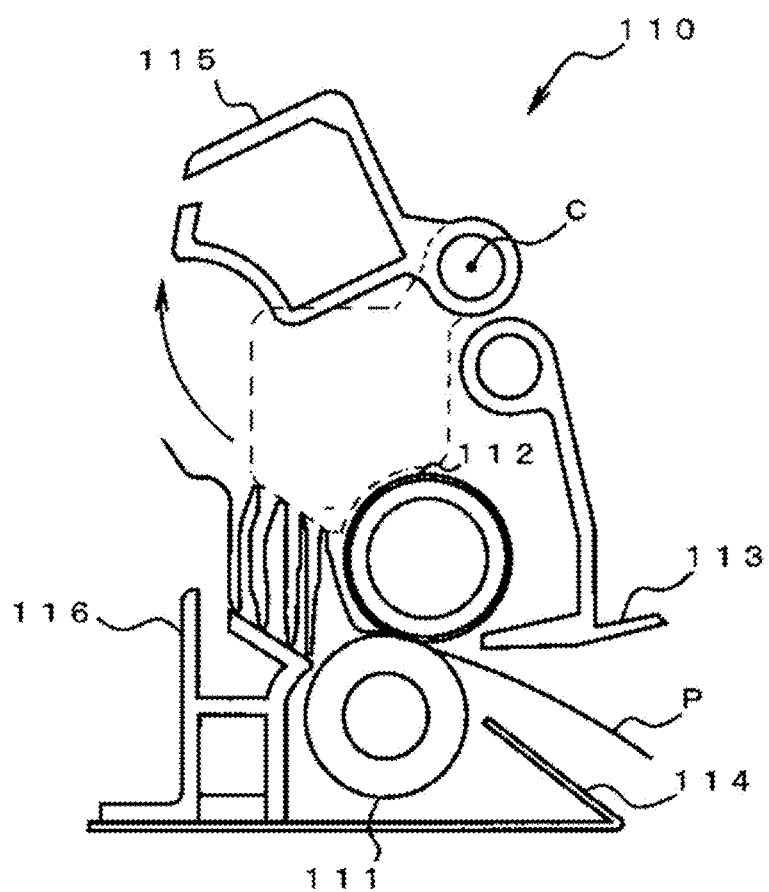
FIG. 8 is a diagram illustrating how jammed paper in a paper ejection path is removed.

FIG. 8 is a diagram illustrating how jammed paper in the paper ejection path 206 is removed.

When a paper jam occurs in the paper ejection path 206, then as illustrated in FIG. 1, the sheet of paper conveying unit 100 is slid with respect to the main body of the printer 1 and pulled out from the main body. Next, a paper ejection cover 260a (see FIG. 4) of the paper ejection portion 260 is opened to expose the paper ejection path 206. Next, as illustrated in FIG. 8, the jammed paper P jammed in the paper ejection path 206 is grasped and pulled out upward. At this time, following the movement of the jammed paper, the upper air duct 115 rotates from the facing position indicated by a broken line in the figure to the retracted position indicated by a solid line in the figure. As a result, the upper air duct 115 can be prevented from interfering with the movement of the jammed paper, and the jammed paper can be removed with ease.

When the jammed paper is removed from the paper ejection path 206, the upper air duct 115 rotates counterclockwise in the figure by an urging force of the torsion springs 118a and 118b, and automatically returns to the facing position indicated by the broken line in the figure.

Figure 9:
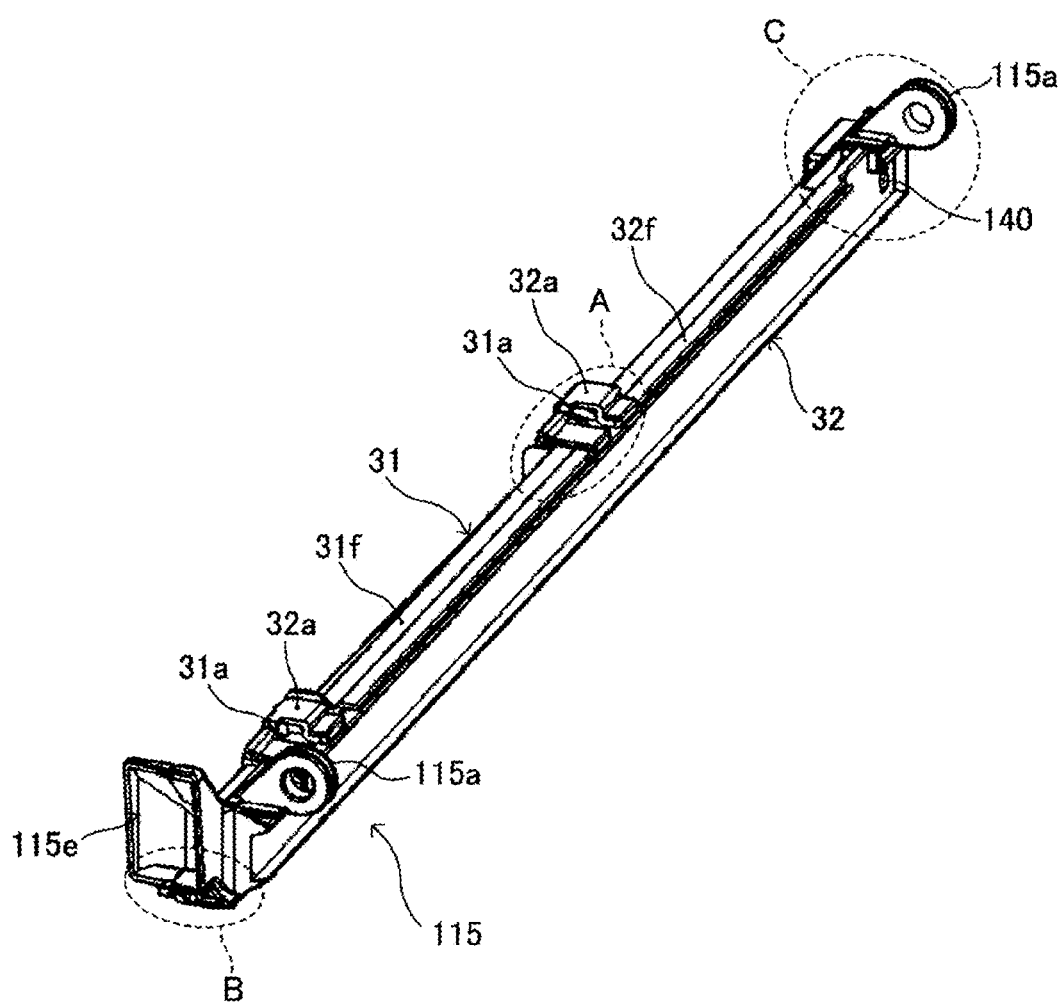
FIG. 9 is a perspective view of an upper air duct.
Figure 10:
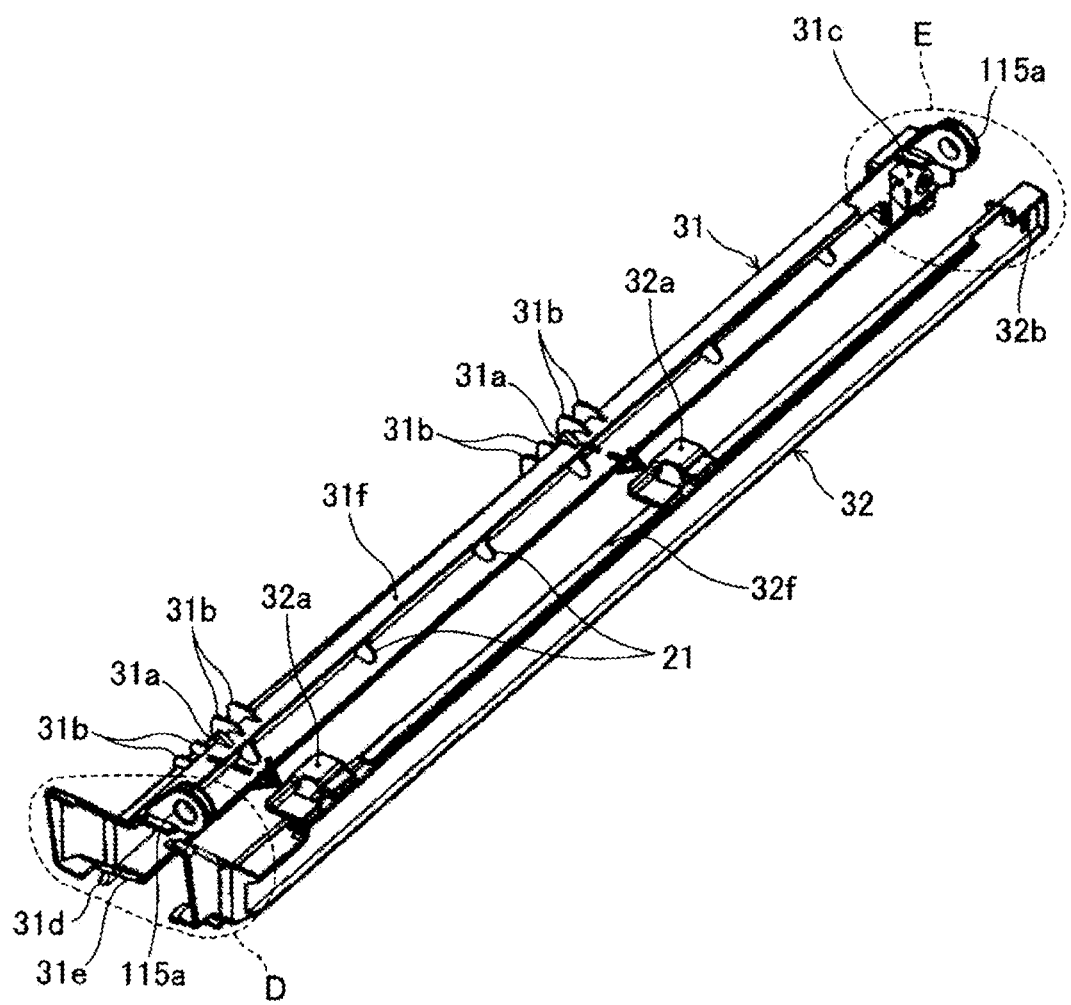
FIG. 10 is an exploded perspective view of the upper air duct.

FIG. 9 is a perspective view of the upper air duct 115, and FIG. 10 is an exploded perspective view of the upper air duct 115.

The upper air duct 115 as a part includes a first member 31 and a second member 32, and by combining these, the upper air path 115d as an internal space through which the cooling air flows is formed. A front side end portion (upstream end portion in a flow direction of the cooling air) of the upper air duct 115 is provided with an upper receiving port 115e that communicates with the first communication portion 123b (see FIG. 5) of the communication pipe 123 and receives the cooling air from the first communication portion 123b.

Engagement protrusions 31a are provided on substantially the center of an upper surface 31f of the first member 31 in the front-rear direction (longitudinal direction of the upper air duct 115, which is also the flow direction of the cooling air) and near the front side thereof.

Moreover, engagement portions 32a to be engaged with the engagement protrusions 31a of the first member 31 are provided on substantially the center of an upper surface 32f of the second member 32 in the front-rear direction and near the front side thereof.

The first member 31 and the second member 32 are resin molded products, for which liquid crystal polymer (LCP) having a low molding shrinkage ratio is used in order to suppress warpage during molding. The warpage during molding is suppressed, whereby the first member 31 and the second member 32 can be accurately molded, and when the first member 31 and the second member 32 are combined with each other, a gap can be inhibited from being formed between the first member 31 and the second member 32.

Thus, the cooling air can be inhibited from leaking out from the gap between the first member 31 and the second member 32.

Moreover, the warpage during molding is suppressed, whereby the upper sheet-of-paper guide surface portion 115b of the upper air duct 115, which faces the upper surface of the sheet of paper P conveyed in the paper ejection path 206 and guides the sheet of paper P, can be inhibited from having a concave shape or a convex shape. Thus, the sheet of paper can be guided satisfactorily.

Further, as illustrated in FIG. 10, the first member 31 is provided with a plurality of hooking prevention ribs 31b as hooking prevention portions which face tip end sides of the engagement portions 32a as portions protruding from the upper surface 31f of the first member 31 and serve for preventing an operator's finger or the like from being caught on the tip end sides of the engagement portions 32a. Of these hooking prevention ribs 31b, the hooking prevention ribs 31b which face a second coupling portion 132c (see FIG. 11) of the engagement portion 32a are provided so as to protrude from the upper surface 31f of the first member 31.

Figure 11:
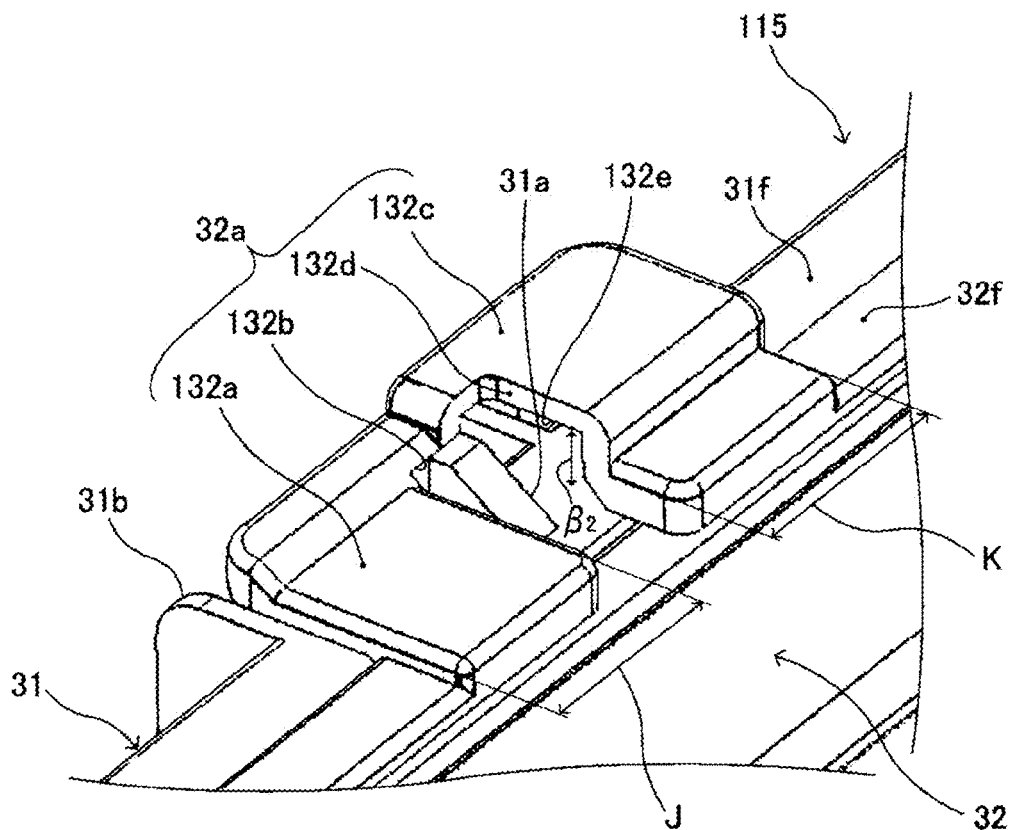
FIG. 11 is an enlarged view of a vicinity of A in FIG. 9, seen from a second member.
Figure 12:
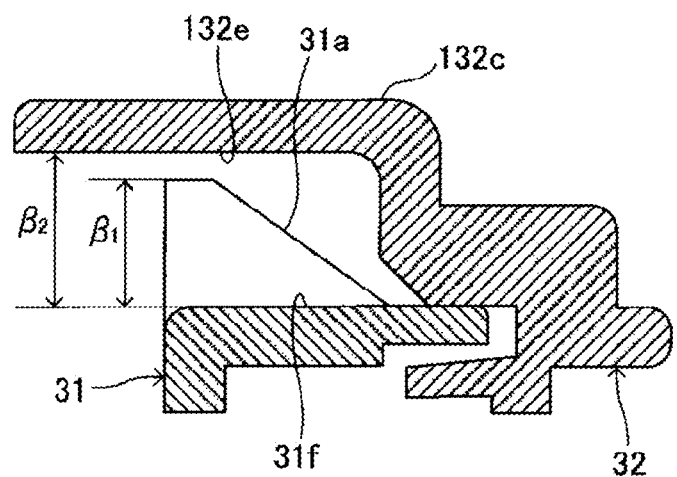
FIG. 12 is a schematic cross-sectional view when an engagement protrusion is located in an escape portion.
Figure 13:
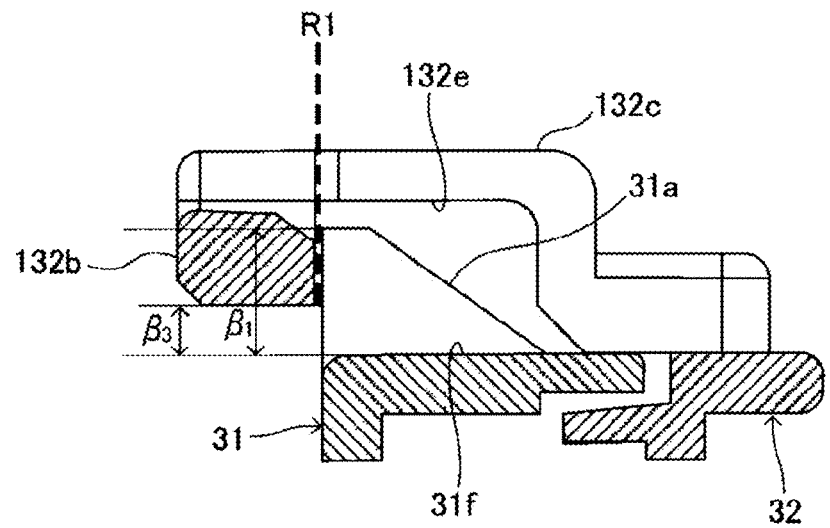
FIG. 13 is a schematic cross-sectional view when the engagement protrusion engages with an engagement portion.

FIG. 11 is an enlarged view of a vicinity of A in FIG. 9, seen from the second member 32, FIG. 12 is a schematic cross-sectional view when the engagement protrusion 31a is located in an escape portion 132e, and FIG. 13 is a schematic cross-sectional view when the engagement protrusion 31a engages with the engagement portion 32a.

The engagement portion 32a includes: a facing portion 132b that faces the engagement protrusion 31a from a downstream side in a separating direction of the first member 31 with respect to the second member 32; a first coupling portion 132a that is connected to a front side end portion of the facing portion 132b and couples the facing portion 132b to the main body of the second member 32; and a second coupling portion 132c that is connected to a rear side end portion of the facing portion 132b and couples the facing portion 132b to the main body of the second member 32.

As illustrated in FIG. 13, a height β3 of the facing portion 132b from the upper surface 31f of the first member 31 is lower than a height β1 of the engagement protrusion 31a from the upper surface 31f of the first member 31. Thus, the facing portion 132b faces the engagement protrusion 31a, the engagement protrusion 31a engages with the engagement portion 32a, and the first member 31 can be assembled to the second member 32 (is configured not to separate therefrom in a direction orthogonal to the front-rear direction).

In the second coupling portion 132c, a first member 31 side thereof is formed into a step shape that is one step higher than a second member 32 side thereof and the facing portion 132b, whereby the escape portion 132e is formed, which escapes so that the engagement protrusion 31a is movable in a moving direction of the first member 31 when the first member 31 is made to face the second member 32 so as to contact the same (this moving direction is illustrated as a direction of a broken line arrow in FIG. 10, hereinafter referred to as a matching direction) and movable in the front-rear direction. As illustrated in FIG. 12, the escape portion 132e is a lower surface of the stepped portion on the tip end side of the second coupling portion 132c, and has a shape in which the first member 31 side is open. A height β2 from the upper surface 31f of the first member 31 to the escape portion 132e is higher than the height β1 of the engagement protrusion 31a from the upper surface 31f of the first member 31. With such a configuration, in the escape portion 132e, the engagement protrusion 31a can move in the matching direction and the front-rear direction.

Further, between the first coupling portion 132a and the second coupling portion 132c in the engagement portion 32a of the present embodiment, there is an opening portion 132d opened, and when the first member 31 is combined with the second member 32, it can be visually confirmed that the engagement protrusion 31a faces the facing portion 132b.

In the present embodiment, both ends of the facing portion 132b are coupled by the coupling portions 132a and 132c, and the facing portion 132b is shaped like being double-sided supported. When only one end of the facing portion 132b is coupled by the coupling portion, a stress is concentrated on a coupling location of the coupling portion and the facing portion 132b when the engagement protrusion 31a abuts against the facing portion 132b, and this may result in a damage of the engagement portion 32a. In particular, in the present embodiment, since the material of the second member 32 is LCP having low toughness in order to suppress the warpage during molding as mentioned above, there is a high possibility that the coupling location of the coupling portion and the facing portion 132b is damaged.

On the other hand, in the present embodiment, since both ends of the facing portion 132b are coupled by the coupling portions, the stress when the engagement protrusion 31a abuts against the facing portion 132b can be dispersed to the coupling location of the first coupling portion 132a to the facing portion 132b and a coupling portion of the second coupling portion 132c to the facing portion 132b. Thus, the engagement portion 32a can be inhibited from being damaged.

Further, as illustrated in FIG. 11, a length J of the first coupling portion 132a in the front-rear direction and a length K of the second coupling portion 132c in the front-rear direction are increased, whereby strength of these coupling portions 132a and 132c can be increased, and it becomes possible to reduce the number of engagement protrusions 31a and the engagement portions 32a.

Figure 14:
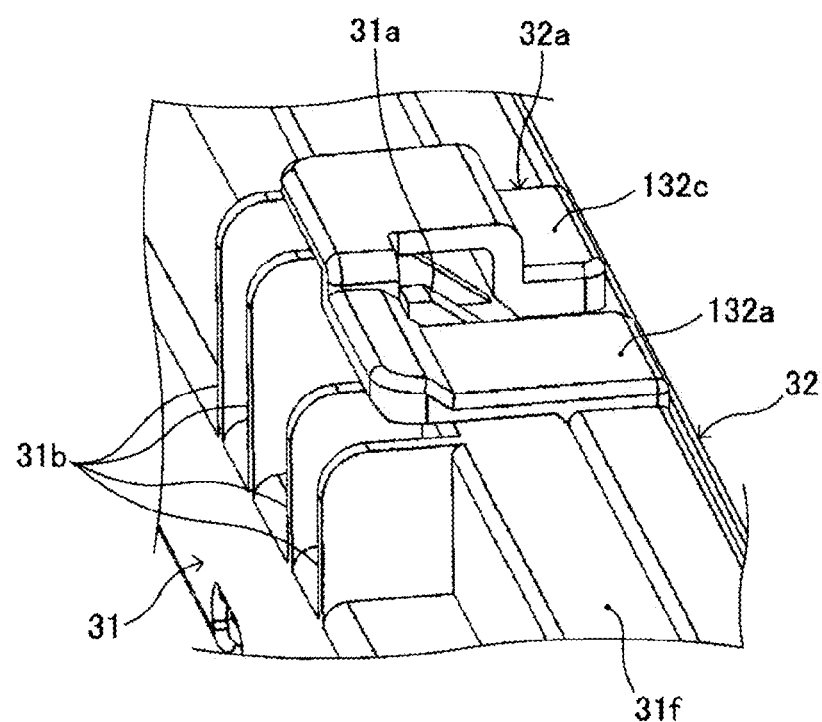
FIG. 14 is an enlarged view of the vicinity of A in FIG. 9, seen from a first member.

FIG. 14 is an enlarged view of the vicinity of A in FIG. 9, seen from the first member 31.

As can be seen from FIG. 14, in the present embodiment, the tip end side of the engagement portion 32a does not face the upper surface 31f of the first member 31, and protrudes from the upper surface 31f to a first member arrangement side.

As described with reference to FIG. 8, in the present embodiment, when a paper jam occurs in the paper ejection path 206, the paper ejection cover 260a (see FIG. 4) of the paper ejection portion 260 is opened to expose the paper ejection path 206, and the jammed paper P jammed in the paper ejection path 206 is removed. At this time, the upper air duct 115 is exposed, and the engagement portion 32a is noticeable. The upper air duct 115 is configured to rotate to the retracted position following the movement of the jammed paper when removing the jammed paper, and some user sometimes grasps and rotates the upper air duct 115 at the time of confirming whether the jammed paper remains, and so on. At this time, when the user tries to rotate the upper air duct 115 by hooking the finger on the tip end side of the engagement portion 32a, which protrudes from the upper surface 31f of the first member 31, the engagement portion 32a may be deformed from, as fulcrums, a root of the first coupling portion 132a (the root is a connection portion thereof to the second member main body) and a root of the second coupling portion 132c, and stresses may be concentrated on the root of the first coupling portion 132a and the root of the second coupling portion 132c. In the present embodiment, as mentioned above, since the second member 32 is made of a material having low toughness, the root of the first coupling portion 132a and the root of the second coupling portion 132c may be cracked and damaged when stresses are concentrated on these roots.

Therefore, in the present embodiment, as illustrated in FIG. 14, the plurality of hooking prevention ribs 31b are provided to prevent the operator's finger from being caught on the tip end side of the engagement portion 32a, which protrudes from the upper surface 31f of the first member 31. Specifically, a gap between tops of the hooking prevention ribs 31b and a lower surface on the tip end side of the engagement portion 32a is set to less than a thickness of the finger (6 mm in the present embodiment). As mentioned above, the tip end side of the second coupling portion 132c has the escape portion 132e that is one step higher than the facing portion 132b and the first coupling portion 132a. Hence, the hooking prevention ribs 31b which face the escape portion 132e of the second coupling portion 132c are projected upward from the upper surface 31f of the first member 31, and are set higher than the hooking prevention ribs which face the first coupling portion 132a. Thus, the gap between the escape portion 132e and the hooking prevention ribs 31b can be set to less than the thickness of the finger. Moreover, an interval between the hooking prevention ribs 31b is also set to less than the thickness of the finger (6 mm in the present embodiment), and the finger is not allowed to enter between the hooking prevention ribs 31b. Further, in the present embodiment, the number of the hooking prevention ribs 31b made to face one engagement portion 32a is four, but the number of the hooking prevention ribs 31b made to face one engagement portion 32a just needs to be appropriately determined depending on the length of the engagement portion 32a in the front-rear direction.

Moreover, in the present embodiment, by the ribs, the operator's finger is prevented from being caught on the tip end side of the engagement portion 32a (which is a portion of the engagement portion 32a, which protrudes from the upper surface 31f of the first member 31 to the first member disposition side); however, such prevention means is not limited to the ribs, and may have any shape as long as the operator's finger is not caught on the tip end side of the engagement portion 32a. For example, the prevention means may be a surface that faces the tip end of the engagement portion 32a from below with a gap less than the thickness of the finger, or a surface that faces the tip end of the engagement portion 32a from the side.

Figure 15A:
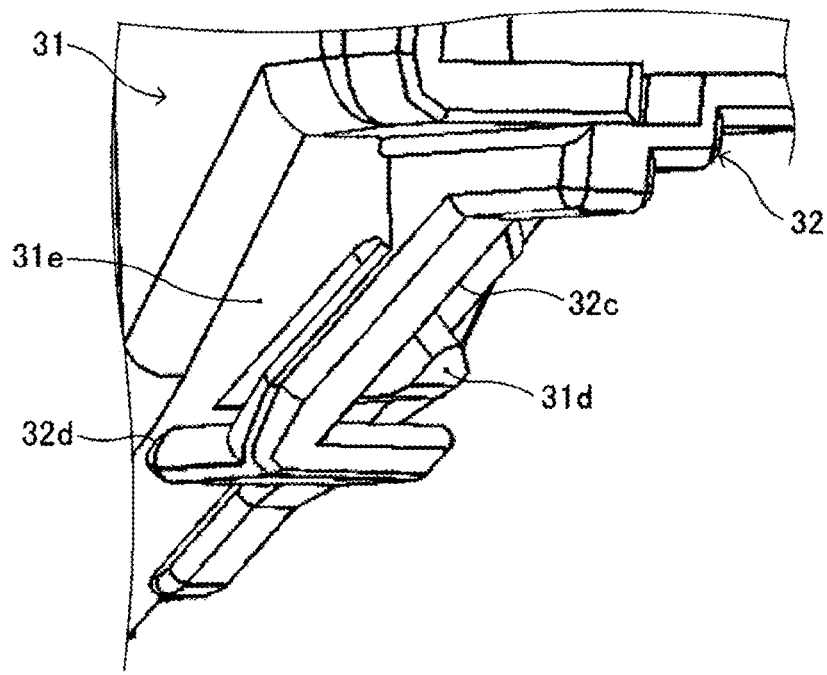
FIGS. 15A and 15B are enlarged views of a vicinity of B in FIG. 9.
Figure 15B:
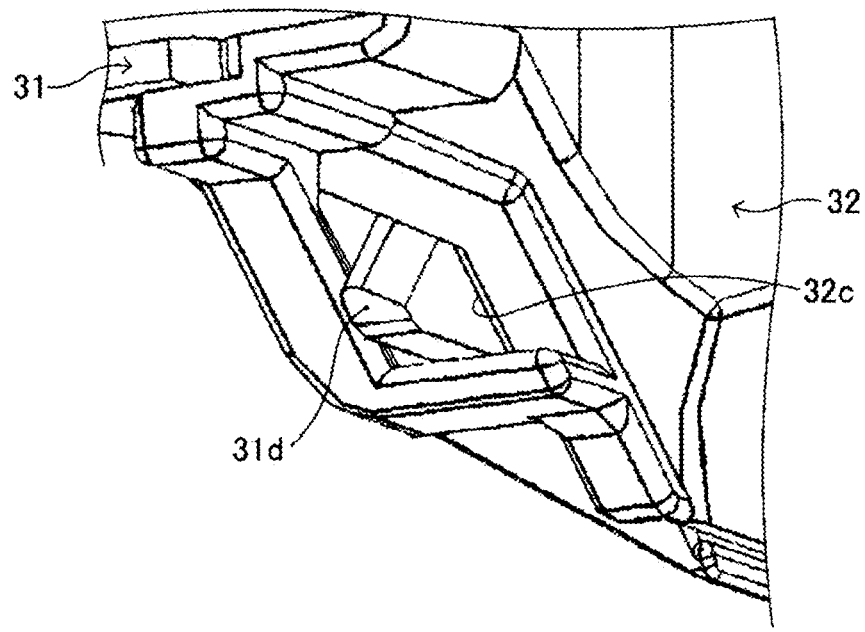
Figure 16A:
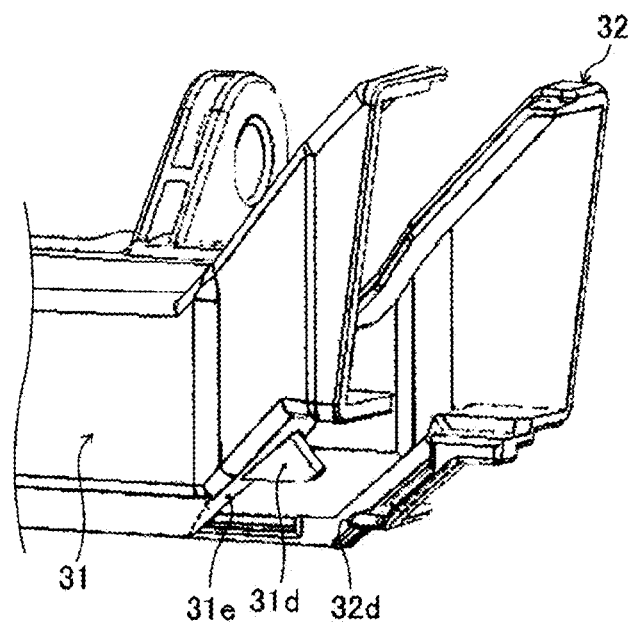
FIGS. 16A and 16B are enlarged views of a vicinity of D in FIG. 10.
Figure 16B:
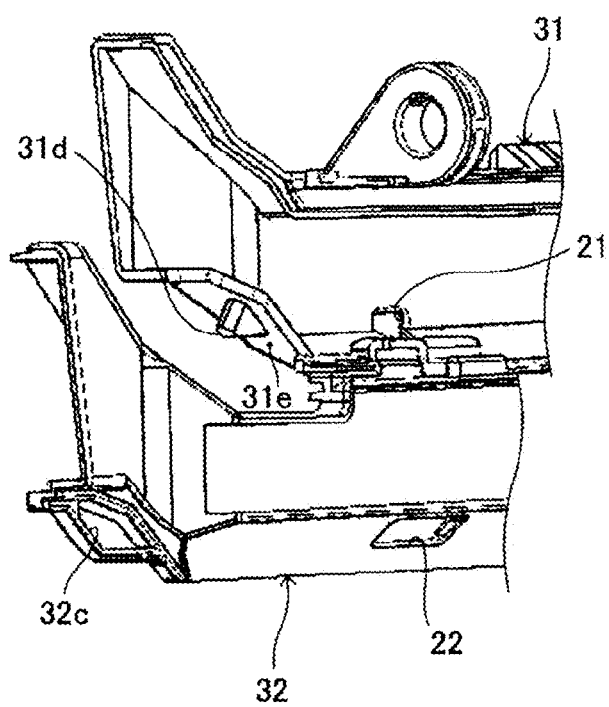

FIGS. 15A and 15B are enlarged views of a vicinity of B in FIG. 9: FIG. 15A is an enlarged perspective view seen from the first member 31 side; and FIG. 15B is an enlarged perspective view seen from the second member 32 side. Further, FIGS. 16A and 16B are enlarged views of a vicinity of D in FIG. 10: FIG. 16A is an enlarged exploded perspective view seen from the first member 31 side; and FIG. 16B is an enlarged exploded perspective view seen from the second member 32 side.

A guide protrusion 31d is provided on an inclined surface 31e that is a facing surface that faces a front side end portion of the first member 31 in a front-rear direction. A front side end portion of the second member 32 is provided with a guide hole 32c for guiding the guide protrusion 31d. Moreover, the second member 32 is provided with an abutment protrusion 32d as a second positioning portion that abuts against the inclined surface 31e of the first member 31 and performs positioning in the front-rear direction when screwing.

As illustrated in FIGS. 15A and 15B, in a state in which the first member 31 is assembled to the second member 32, the guide protrusion 31d is inserted into the guide hole 32c and is in engagement with the guide hole 32c. Thus, when the front side end portion of the first member 31 tries to move in the separating direction, the guide protrusion 31d abuts against the guide hole 32c, and the movement of the first member 31 is restricted. Thus, a gap can be inhibited from being formed between the front side of the first member 31 and the front side of the second member 32, and the cooling air received from the upper receiving port 115e can be inhibited from leaking out from the gap between the first member 31 and the second member 32.

Further, in the present embodiment, the first member 31 is provided with the guide projection, and the second member 32 is provided with the guide hole and the abutment protrusion; however, the second member 32 may be provided with the guide protrusion, and the first member 31 may be provided with the guide hole and the abutment protrusion.

Moreover, in the present embodiment, a guide portion of the second member 32, which guides the guide protrusion 31d, is defined as a guide hole; however, at least a portion that faces the guide protrusion 31d from the second member side and a portion that faces the guide protrusion 31d from the first member side just need to be provided, and for example, the guide portion ma have a groove shape in which a lower side is opened.

Figure 17:
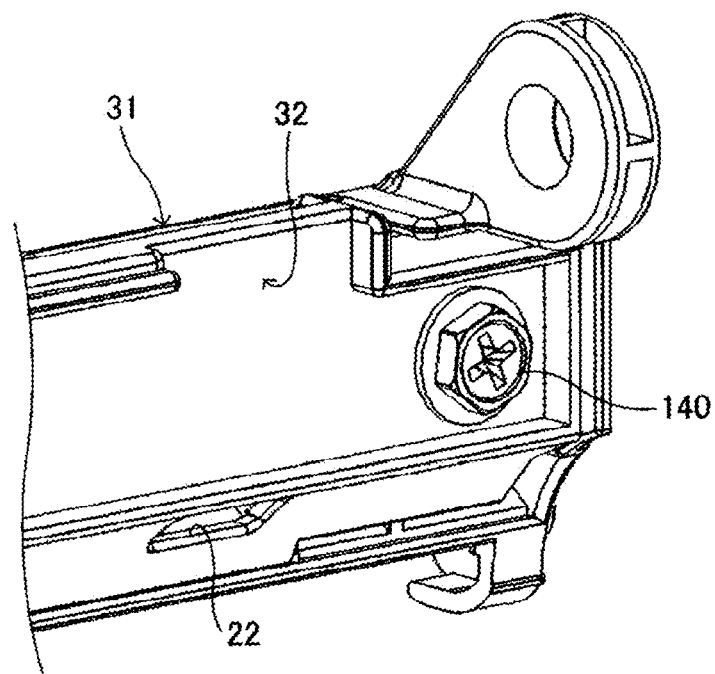
FIG. 17 is an enlarged view of a vicinity of C in FIG. 9.
Figure 18:
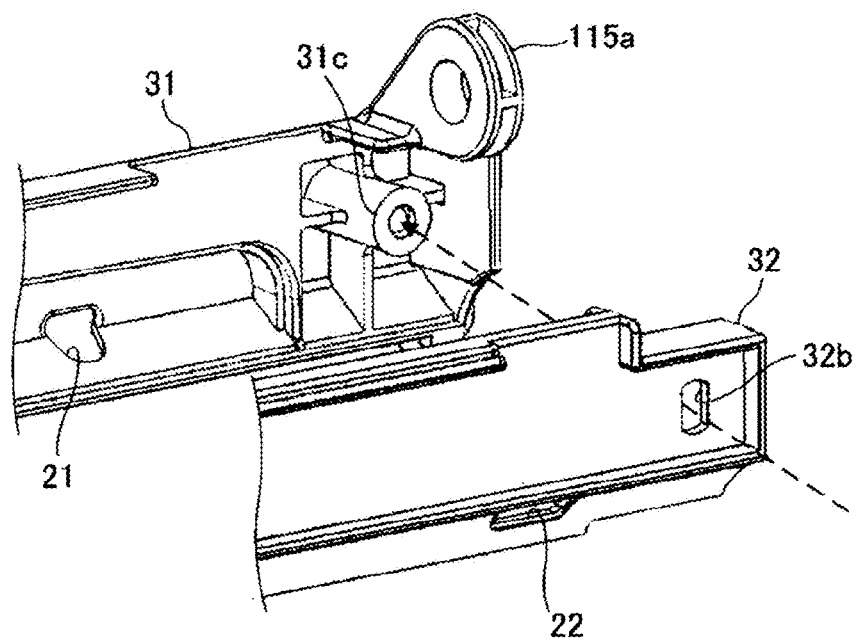
FIG. 18 is an enlarged view of a vicinity of E in FIG. 10.

FIG. 17 is an enlarged view of a vicinity of C in FIG. 9, and FIG. 18 is an enlarged view of a vicinity of E in FIG. 10.

As illustrated in FIG. 18, on the rear side of the first member 31, a cylindrical screwing boss portion 31c having a thread groove formed on an inner peripheral surface thereof is provided, and on the rear side of the second member 32, a screw through hole 32b which a screw 140 as a fastening member penetrates is provided.

After the first member 31 is assembled to the second member 32, as illustrated in FIG. 17, the screw 140 is screwed into the screwing boss portion 31c, and the first member 31 and the second member 32 are fastened to each other by the screw 140.

Next, the assembling of the first member 31 to the second member 32 will be described.

Figure 20A:
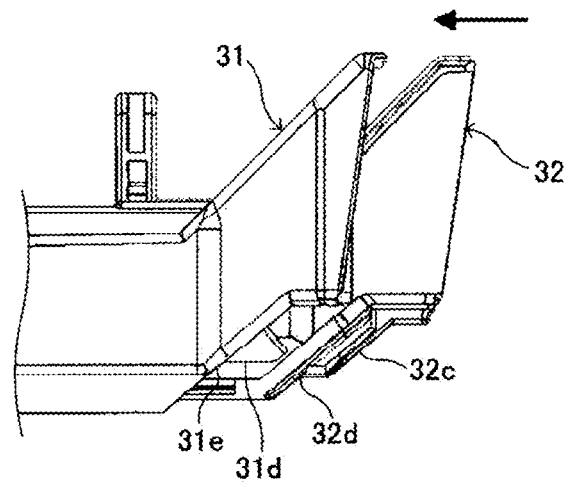
FIGS. 20A to 20C are views illustrating a vicinity of a front side when the first member is assembled to the second member.
Figure 20B:
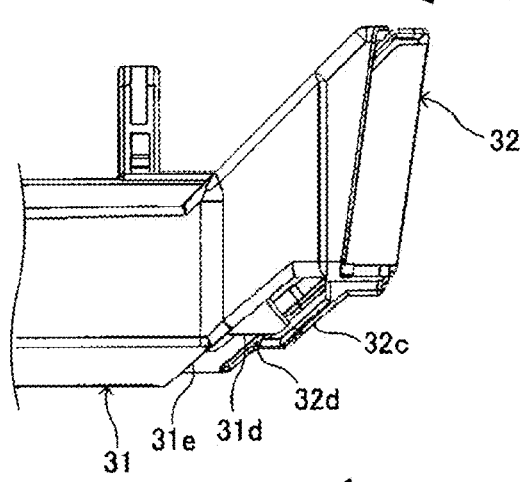
Figure 20C:
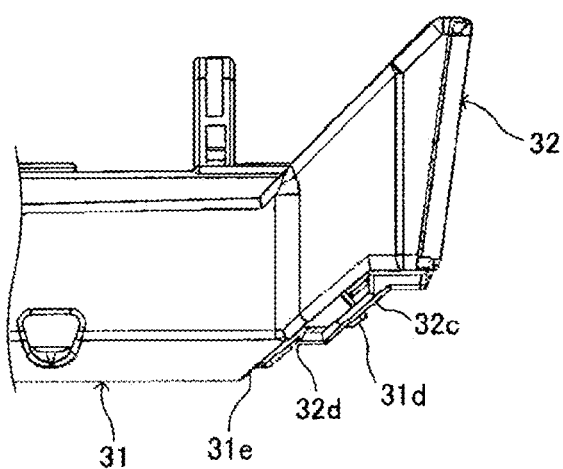

FIGS. 19A to 19F are views illustrating a vicinity of the engagement portion 32a when the first member 31 is assembled to the second member 32. Moreover, FIGS. 20A to 20C are views illustrating the vicinity of the front side when the first member 31 is assembled to the second member 32.

In the present embodiment, in a state in which the first member 31 is shifted rearward with respect to the second member 32, the first member 31 is moved relatively to the second member 32 in the matching direction, and the first member 31 is made to face the second member 32 so as to contact the same.

In the present embodiment, the escape portion 132e is provided, in which the first member 31 side of the second coupling portion 132c is raised by a step, the height β2 of the first member 31 from the upper surface 31f is higher than the height β1 of the engagement protrusion 31a, and the first member side is opened. Therefore, as illustrated in FIG. 19A, when the first member 31 is made to face the second member 32 so as to contact the same, the engagement protrusion 31a can be inserted into the escape portion 132e.

Unlike the present embodiment, when there is made a configuration in which a sidewall that extends downward from a first member-side end portion (tip end) of the second coupling portion 132c to a lower end of the facing portion 132b is provided to close the first member 31 side of the escape portion 132e, and the engagement protrusion 31a is not movable in the matching direction, then it is necessary to insert the engagement protrusion 31a into the escape portion 132e from the front-rear direction. Hence, after the first member 31 is largely shifted rearward with respect to the second member 32 and the first member 31 is made to face the second member 32 so as to contact the same, the second member 32 is moved rearward relatively to the first member 31, whereby the engagement protrusion 31a is inserted into the escape portion 132e. As a result, there increases a slide amount of the second member 32 in the front-rear direction relative to the first member 31, the slide amount serving for causing the engagement protrusion 31a to face the facing portion 132b of the engagement portion 32a.

On the other hand, in the present embodiment, the first member 31 side of the escape portion 132e is open, and the engagement protrusion 31a is made movable also in the matching direction. Thus, the engagement protrusion 31a can be inserted into the escape portion 132e when the first member 31 is made to face the second member 32 so as to contact the same, and a shift amount of the first member 31 with respect to the second member 32 in the front-rear direction can be reduced when the first member 31 is made to face the second member 32. Hence, the slide amount of the second member 32 in the front-rear direction relative to the first member 31, the slide amount serving for causing the engagement protrusion 31a to face the facing portion 132b of the engagement portion 32a, can be reduced, and ease of assembly can be improved.

When the engagement protrusion 31a is inserted into the escape portion 132e, the second member 32 is moved rearward relatively to the first member 31 as indicated by arrows in the figures. Then, as illustrated in in FIGS. 19B and 19E, the engagement protrusion 31a faces the facing portion 132b.

Moreover, as illustrated in FIG. 20A, when the engagement protrusion 31a is inserted into the escape portion 132e, and the first member 31 is made to face the second member 32 so as to contact the same in a state in which the first member 31 is shifted rearward with respect to the second member 32, then the guide protrusion 31d formed on the inclined surface 31e that faces the front-rear direction of the first member 31 is located behind the guide hole 32c. When the second member 32 is moved rearward relatively to the first member 31 as indicated by the arrows in the figures, then as illustrated in FIG. 20B, the guide hole 32c moves rearward relatively to the guide protrusion 31d, and as illustrated in FIG. 20C, the guide protrusion 31d is inserted into the guide hole 32c. In this way, the second member 32 can be moved rearward relatively to the first member 31 while the guide protrusion 31d is being guided in the guide hole 32c, and the first member 31 and the second member 32 can be assembled to each other with ease.

When the second member 32 is further moved rearward relatively to the first member 31 from the state of FIG. 20C, the abutment protrusion 32d of the second member 32 abuts against the inclined surface 31e of the first member 31, the movement thereof in the front-rear direction is restricted, and the first member 31 and the second member 32 are positioned in the front-rear direction.

When the abutment protrusion 32d of the second member 32 is abutting against the inclined surface 31e of the first member 31, then as illustrated in FIG. 19F, the engagement protrusion 31a completely faces the facing portion 132b, the first member 31 and the second member 32 are engaged with each other, and the first member 31 is assembled to the second member 32.

Further, when the first member 31 is assembled to the second member 32 as described above, then as illustrated in FIG. 19F, the engagement protrusion 31a is located between the first coupling portion 132a and the second coupling portion 132c, and becomes visible from the opening portion 132d. Thus, it is can be visually confirmed that the first member 31 is assembled to the second member 32.

Moreover, when the first member 31 is assembled to the second member 32, a gap α is formed between the engagement protrusion 31a and the first coupling portion 132a, and the engagement protrusion 31a is not in contact with the first coupling portion 132a. Thus, the abutment protrusion 32d can be made to abut against the inclined surface 31e of the first member 31 to perform the positioning in the front-rear direction.

Figure 21:
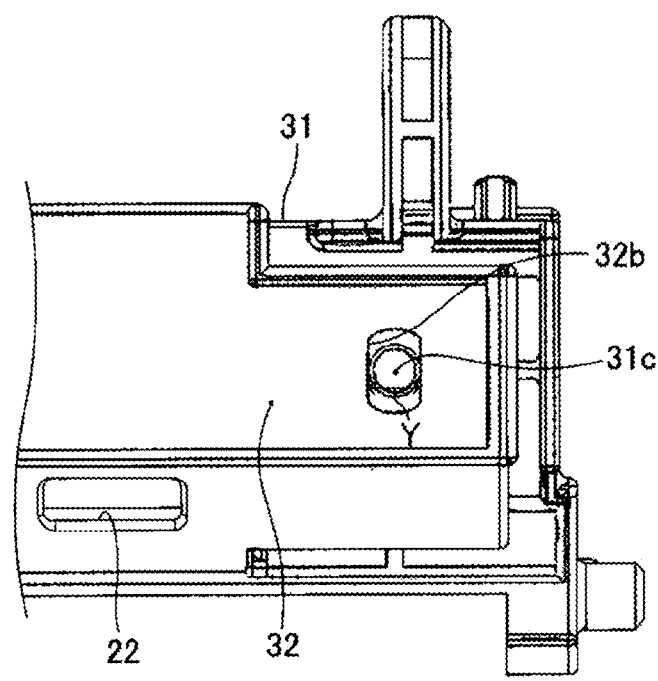
FIG. 21 is a view illustrating a rear side of an upper air guide when an abutment protrusion abuts against an inclined surface of the first member and positioning in a front-rear direction is performed.

FIG. 21 is a view illustrating a rear side of the upper air duct 115 when the abutment protrusion 32d abuts against an inclined surface 31e of the first member 31 and the positioned in the front-rear direction is performed.

As illustrated in FIG. 21, when the abutment protrusion 32d abuts against the inclined surface 31e of the first member 31 and the positioning in the front-rear direction is performed, the position of the screw through hole 32b of the second member 32 in the front-rear direction and the position of the screwing boss portion 31c of the first member 31 in the front-rear direction substantially coincide with each other. Thus, the second member 32 and the first member 31 can be easily fastened to each other by the screw 140. The first member 31 and the second member 32 are fastened to each other by the screw 140, whereby the first member 31 is fixed to the second member 32.

Further, in the present embodiment, as illustrated in FIG. 21, a length Y of the screw through hole 32b of the second member 32 in the front-rear direction is substantially the same as a diameter of a shaft portion of the screw 140. Thus, the screw 140 is inserted into the screw through hole 32b, whereby the positions of the second member 32 and the first member 31 in the front-rear direction are completely determined. In the present embodiment, the shaft portion of the screw 140 and the screw through hole 32b serve as a main reference for the positioning in the front-rear direction, and the abutment of the abutment protrusion 32d against the inclined surface 31e serves as a sub-reference for the positioning in the front-rear direction.

Further, in the present embodiment, both sides in the front-rear direction are positioned in the front-rear direction, whereby two engagement protrusions 31a, which are arranged between the front-side positioning in the front-rear direction (that is, the abutment of the abutment protrusion 32d against the inclined surface 31e) and the rear-side positioning in the front-rear direction (that is, the fastened portion to the screw 140), can be made to face the facing portions 132b satisfactorily. Thus, the first member 31 and the second member 32 can be satisfactorily engaged with each other.

Figure 22:
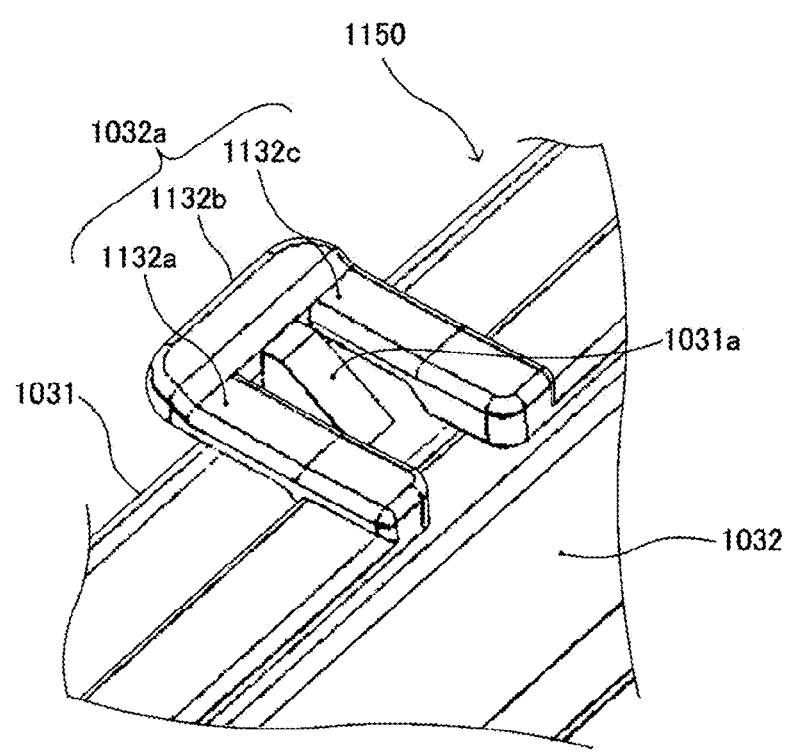
FIG. 22 is an enlarged perspective view illustrating an engagement portion of an upper air duct of a conventional example.
Figure 23A:
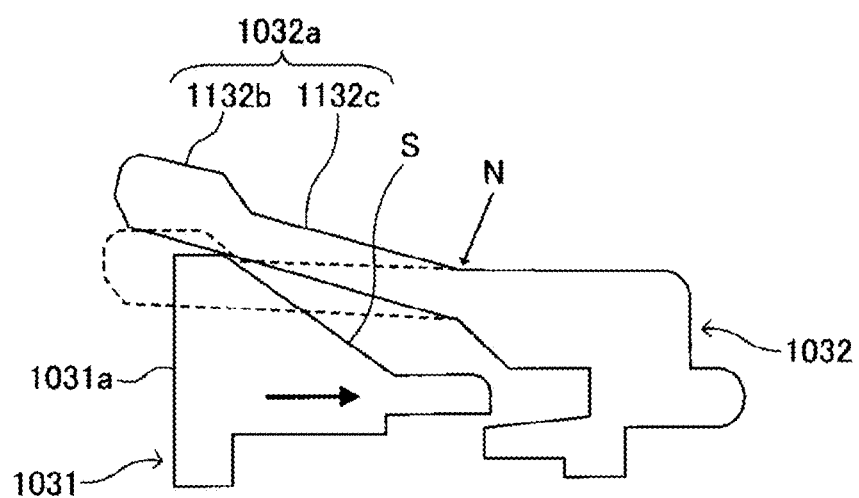
FIGS. 23A and 23B are views illustrating a state in which the engagement protrusion of the first member of the conventional example is engaged with the engagement portion.
Figure 23B:
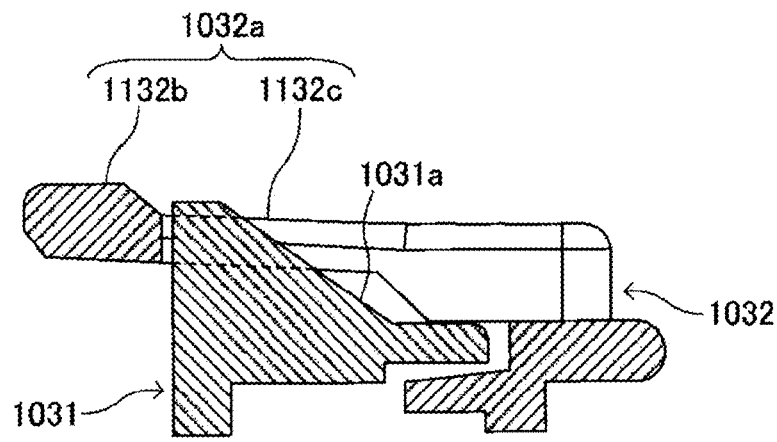

FIG. 22 is an enlarged perspective view illustrating an engagement portion 1032a of an upper air duct 1115 of a conventional example, and FIGS. 23A and 23B are views illustrating a state of engaging an engagement protrusion 1031a of a first member 1031 of the conventional example with the engagement portion 1032a.

As illustrated in FIG. 22, in the engagement portion 1032a of a second member 1032 of the conventional upper air duct 1115, a second coupling portion 1132c coupled to a rear side end portion of a facing portion 1132b does not have a step shape, in which an escape portion is not formed. In the upper air duct 1115 of this conventional example, when the first member 1031 is assembled to the second member 1032, the first member 1031 and the second member 1032 are positionally matched with each other in the front-rear direction, and as illustrated in FIGS. 23A and 23B, an inclined surface S of the engagement protrusion 1031a abuts against the facing portion 1132b. When the first member 1031 is further moved in this state to the second member 1032 side relatively to the second member 1032, respective coupling portions 1132a and 1132c are elastically deformed (elastically deformed from a state of a dotted line in FIG. 23A to a state of a solid line in FIG. 23A) about, as a fulcrum, connection locations N of the respective coupling portions to the main body of the second member, and the facing portion 1132b climbs up the inclined surface S. Then, the facing portion 1132b gets over the engagement protrusion 1031a, whereby, as illustrated in FIG. 23B and FIG. 22, the facing portion 1132b faces the engagement protrusion 1031a from the first member 1031 side, and the first member 1031 is engaged with the second member 1032.

However, as mentioned above, since the second member is formed of LCP having low toughness for the purpose of suppressing warpage during molding, the connection locations N of the respective coupling portions under stress to the main body of the second member may have been damaged.

On the other hand, in the present embodiment, as described above, the escape portion 132e is formed in the second coupling portion 1032c, and the second member 32 is moved in the front-rear direction relatively to the first member 31 after the engagement protrusion 31a is inserted into the escape portion 132e, whereby the facing portion 132b is made to face the engagement protrusion 31a from the first member 31 side. As described above, in the present embodiment, the facing portion 132b can be made to face the engagement protrusion 31a from the first member 31 side without being made to get over the engagement protrusion 31a, and the coupling portions 132a and 132c are not damaged even if the second member 32 is formed of a material having low toughness. Thus, the second member 32 can be prevented from being damaged when the first member 31 is assembled to the second member 32.

Figure 24A:
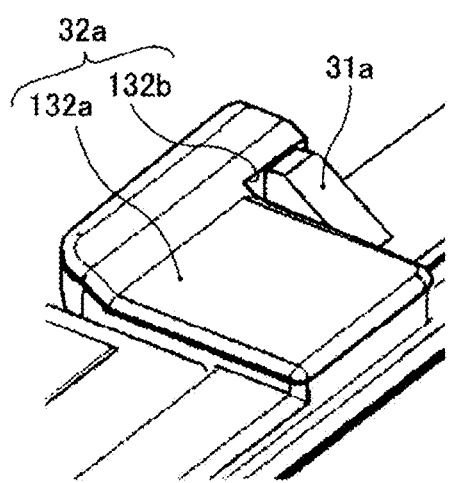
FIGS. 24A and 24B are views illustrating an engagement portion from which a second coupling portion is eliminated.
Figure 24B:
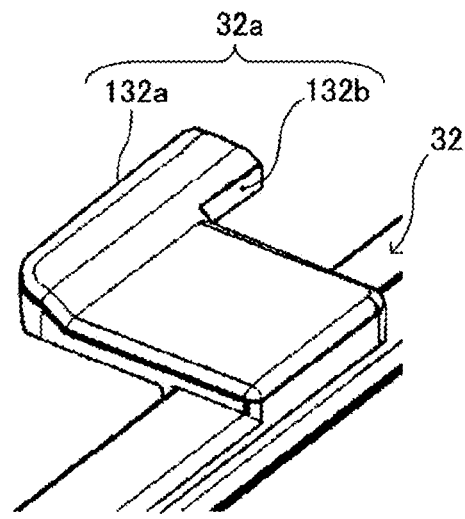

When a material having high toughness is used as the second member 32, then as illustrated in FIGS. 24A and 24B, the second coupling portion 132c may be omitted, and the engagement portion 32a may be formed into a key shape. Even with such a configuration, the second member 32 is moved in the front-rear direction relatively to the first member 31, whereby the facing portion 132b can be made to face the engagement protrusion 31a from the first member 31 side, and the facing portion 132b can be made to face the engagement protrusion 31a from the first member 31 side without causing the facing portion 132b to get over the engagement protrusion 31a.

What has been described above is an example, and a unique effect is exerted in each of the following aspects.

(Aspect 1)

A part such as an upper air duct 115 including: a first member 31; and a second member 32, wherein the second member 32 includes an engagement portion 32a that engages with an engagement protrusion 31a of the first member 31 and restricts separation of the first member 31 with respect to the second member 32 in a predetermined direction (in the present embodiment, a direction orthogonal to the front-rear direction: the matching direction of the first member and the second member), wherein the engagement portion 32a includes: a facing portion 132b that faces the engagement protrusion 31a from downstream in a separating direction of the first member 31 with respect to the second member 32; a first coupling portion 132a that is connected to one end of the facing portion 132b and couples a main body of the second member 32 and the facing portion 132b to each other; and a second coupling portion 132c that is connected to the other end of the facing portion 132b and couples the main body and the facing portion 132b to each other, and wherein the second coupling portion 132c includes an escape portion 132e in which the engagement protrusion 31a is movable in the separating direction and an orthogonal direction (the front-rear direction in the present embodiment) to the separating direction.

According to this, the escape portion 132e is provided on the second coupling portion 132c of the engagement portion 32a, whereby the engagement protrusion 31a can be engaged with the engagement portion 32a as follows.

That is, first, the first member 31 and the second member 32, which are in a state of being separated from each other, are located so that the engagement protrusion 31a faces the escape portion 132e in the direction (in the present embodiment, the front-rear direction where both members are slid) orthogonal to the above-described separating direction. Next, the first member 31 having the engagement protrusion 31a is moved in an orientation where the first member 31 is matched with the second member 32 relatively in the above-described separating direction, and the engagement protrusion 31a is passed through the escape portion 132e, and is located upstream of the facing portion 132b in the separating direction. Next, the second member 32 is slid relatively to the first member 31 in the orthogonal direction, and the engagement protrusion 31a is moved toward the facing portion 132b of the second member 32. Thus, the engagement protrusion 31a is made to face the facing portion 132b from the upstream side in the separating direction and is engaged with the engagement portion 32a of the second member 32.

As described above, in the aspect 1, the engagement portion 32a of the second member 32 does not get over the engagement protrusion 31a, and the engagement protrusion 31a can be engaged with the engagement portion 32a. Hence, when the first member 31 is engaged with the second member 32, the second member or the first member can be inhibited from being damaged.

(Aspect 2)

In the aspect 1, a height of the escape portion 132e from a surface such as the upper surface 31f of the first member 31 on which the engagement protrusion 31a is provided, is higher than a height of the engagement protrusion 31a, and a downstream side of the escape portion 132e in the separating direction is opened.

According to this, as described in the embodiment, the first member having the engagement protrusion can be moved in an orientation where the first member is matched with the second member relatively in the above-described separating direction, and the engagement protrusion 31a can be passed through the escape portion 132e, and can be located upstream of the facing portion 132b in the separating direction. Moreover, the second member 32 can be slid relatively to the first member 31 in the above-described orthogonal direction, and the engagement protrusion 31a can be moved toward the facing portion 132b of the second member 32.

(Aspect 3)

In the aspect 1 or 2, the engagement portion 32a has an opening portion 132d between the first coupling portion 132a and the second coupling portion 132c.

According to this, as described in the embodiment, it can be visually confirmed that the engagement protrusion 31a reaches a position that faces the facing portion 132b and the first member 31 is engaged with the second member 32.

(Aspect 4)

In any of the aspects 1 to 3, positioning portions which position the second member 32 and the first member 31 in the orthogonal direction such as a front-rear direction are provided closer to one end and closer to the other end in the orthogonal direction, and the engagement portion 32a is disposed between the positioning portion closer to the one end and the positioning portion closer to the other end.

According to this, as described in the embodiment, accuracy of a positional relationship between the engagement portion 32a and the engagement protrusion 31a in the orthogonal direction such as the front-rear direction can be enhanced, and the engagement protrusion 31a can be made to face the facing portion 132b with high accuracy.

(Aspect 5)

In the aspect 4, the positioning portion closer to the one end is a fastening portion that fastens the first member 31 and the second member 32 to each other, and the positioning portion closer to the other end is an abutment portion such as an abutment protrusion 32d that is provided on one (the second member 32 in the present embodiment) of the first member 31 and the second member 32 and abuts against a surface (the inclined surface 31e of the first member 31 in the present embodiment) of the other member (the first member 31 in the present embodiment), the surface being orthogonal to the orthogonal direction such as the front-rear direction.

According to this, as described in the embodiment, the abutment portion abuts the surface orthogonal to the orthogonal direction such as the front-rear direction of the other member (the first member 31 in the present embodiment), whereby the movement of the second member 32 with respect to the first member 31 in the orthogonal direction such as the front-rear direction is restricted, and the other end side can be positioned in the front-rear direction.

Further, the first member 31 and the second member 32 are fastened to each other by a fastening member such as a screw 140, whereby the movement of the second member 32 with respect to the first member 31 in the orthogonal direction such as the front-rear direction is restricted, and positioning in the front-rear direction can be performed at the one end.

Before fastening the first member 31 and the second member 32 to each other, provisional positioning using the abutment portion enables positional matching of a fastened portion of the first member 31, such as a screwing boss portion 31c, and a fastened portion of the second member 32, such as a screw through hole 32b, in the orthogonal direction such as the front-rear direction. Thus, the first member 31 and the second member 32 can be easily fastened to each other by the fastening member such as the screw 140.

(Aspect 6)

In the fifth aspect, the fastening portion is a main reference for the positioning, and the abutment portion such as the abutment protrusion 32d is a sub-reference for the positioning.

According to this, in the positioning by the abutment portion, the second member 32 may move relatively to the first member 31 in the orthogonal direction such as the front-rear direction after the positioning. However, in the fastening portion, the fastening portion such as the screw 140 penetrates the fastened portion of the second member 32, such as the screw through hole 32b, and is fastened to the fastened portion of the first member 31, such as the screwing boss portion 31c, and accordingly, there is no possibility that the second member 32 will move relative to the first member 31 in the orthogonal direction after the positioning. Hence, the fastening portion is defined as a main reference for the positioning, whereby the first member 31 and the second member 32 can be accurately positioned in the orthogonal direction.

(Aspect 7)

In any one of the aspects 4 to 6, when the second member 32 and the first member 31 are positioned by the positioning portion, the engagement protrusion 31a and the first coupling portion 132a are not in contact with each other.

According to this, such a situation as follows can be inhibited from occurring due to a manufacturing error or the like. In the situation, the engagement protrusion 31a abuts against the first coupling portion 132a before the first member 31 and the second member 32 are positioned by the positioning portion in the orthogonal direction such as the front-rear direction, the relative movement of the second member 32 to the first member 31 is restricted, and both thereof are not positioned.

(Aspect 8)

In any one of the aspects 1 to 7, the part includes a guide portion that guides the second member 32 when the second member 32 is moved in the orthogonal direction such as the front-rear direction relatively to the first member 31 in order to cause the facing portion 132b to face the engagement protrusion 31a.

According to this, as described in the embodiment, the first member 31 can be easily assembled to the second member 32.

(Aspect 9)

In the aspect 8, the guide portion includes a guide hole or groove provided in one (the second member 32 in the present embodiment) of the second member 32 and the first member 31 and a guide protrusion 31d that protrudes from a surface orthogonal to the orthogonal direction, such as the inclined surface 31e provided on the other member (the first member 31 in the present embodiment), and is guided in the guide hole or groove.

According to this, as described in the embodiment, when the second member 32 is moved relatively to the first member 31 in the orthogonal direction such as the front-rear direction in order to cause the facing portion 132b to face the engagement protrusion 31a, the guide protrusion 31d is inserted into the guide hole or groove, and the guide protrusion 31d moves relatively in the guide hole or groove while being guided by the guide hole or groove. Thus, the second member 32 can be moved relatively to the first member 31 in the orthogonal direction such as the front-rear direction while being guided.

(Aspect 10)

In any one of the aspects 1 to 9, there is provided a hooking prevention portion such as a hooking prevention rib 31b that prevents a first member side end portion of the engagement portion 32a on a tip end side from being hooked.

According to this, as described in the embodiment, by the hooking prevention portion such as the hooking prevention rib 31b, an operator can be prevented from hooking his/her finger on a portion of the engagement portion 32a, which protrudes to a first member disposition side from the surface such as the upper surface 31f of the first member 31, which is provided with the engagement protrusion 31a. Thus, there can be prevented such a situation in which the operator hooks his/her finger on the portion of the engagement portion 32a, which protrudes toward the first member disposition side, and lifts the engagement portion 32a. Then, a stress can be prevented from being concentrated on the roots of the first coupling portion 132a and the second coupling portion 132c, and the engagement portion 32a can be prevented from being damaged.

(Aspect 11)

In the aspect 10, a height of the hooking prevention portion such as the hooking prevention rib 31b in a location facing the second coupling portion 132c, is higher than a height of the hooking prevention portion in a location facing the first coupling portion 132a.

According to this, as described in the embodiment, the first member side of the second coupling portion 132c is located at a position higher than the first coupling portion 132a, and constitutes the escape portion 132e. Hence, the height of the hooking prevention portion such as the hooking prevention rib 31b in the location facing the second coupling portion 132c, is set higher than the height of the hooking prevention portion in the location facing the first coupling portion 132a, whereby the operator can be prevented from hooking, by his/her finger, the portion of the second coupling portion 132c, which protrudes to the first member disposition side from the surface such as the upper surface 31f of the first member 31, which is provided with the engagement protrusion 31a.

(Aspect 12)

In a cooling device such as a conveyance cooling unit 110 including an upper air duct 115 for blowing air to a sheet conveyance path, the part according to any one of the aspects 1 to 11 is used as the duct.

According to this, when the duct such as the upper air duct 115 is assembled, a damage thereof can be inhibited from occurring.

(Aspect 13)

In an image forming apparatus including: an image recording unit such as an image forming unit 2 that records an image on a sheet such as a sheet of paper; a fixing unit such as a fixing device 106 that fixes the image on the sheet, the image having been recorded by the image recording unit; and a cooling unit such as a conveyance cooling unit 110 that cools the sheet fed out from the fixing unit, the cooling device according to any one of the aspects 1 to 13 is used as the cooling unit.

According to this, the sheet fed out from the fixing unit and conveyance rollers which convey the sheet fed out from the fixing unit can be cooled.

According to an embodiment, damage to the first member or the second member during assembly can be suppressed.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

What is claimed is:

1. A part comprising:
a first member; and
a second member, wherein
the second member includes an engagement portion engaging with an engagement protrusion of the first member and restricting separation of the first member in a predetermined direction with respect to the second member,
the engagement portion includes:
a facing portion facing the engagement protrusion from downstream in a separating direction of the first member with respect to the second member;
a first coupling portion connected to one end of the facing portion and coupling a main body of the second member and the facing portion to each other; and
a second coupling portion connected to the other end of the facing portion and coupling the main body and the facing portion to each other, and
the second coupling portion includes an escape portion between the second coupling portion and the first member in which the engagement protrusion is movable in the separating direction and an orthogonal direction to the separating direction.

2. The part according to claim 1, wherein a height of the escape portion from a surface of the first member, the engagement protrusion being provided on the surface, is higher than a height of the engagement protrusion, and a downstream side of the escape portion in the separating direction is opened.

3. The part according to claim 1, wherein the engagement portion has an opening portion between the first coupling portion and the second coupling portion.

4. The part according to claim 1, wherein positioning portions positioning the second member and the first member in the orthogonal direction include a first position portion provided closer to a first end and a second position portion provided closer to a second end in the orthogonal direction, and the engagement portion is disposed between the first positioning portion closer to the first end and the second positioning portion closer to the second end.

5. The part according to claim 4, wherein
the first positioning portion closer to the first end is a fastening portion fastening the first member and the second member to each other, and
the second positioning portion closer to the second end is an abutment portion provided on one of the first member and the second member and configured to abut against a surface of the other member, the surface being orthogonal to the orthogonal direction.

6. The part according to claim 5, wherein the fastening portion is a main reference for positioning, and the abutment portion is a sub-reference for positioning.

7. The part according to claim 4, wherein when the second member and the first member are positioned by the positioning portions, the engagement protrusion and the first coupling portion are not in contact with each other.

8. The part according to claim 1, wherein the part includes a guide portion configured to guide the second member when the second member is moved in the orthogonal direction relatively to the first member to cause the facing portion to face the engagement protrusion.

9. The part according to claim 8, wherein the guide portion includes:
a guide hole or groove provided in one of the second member and the first member; and a guide protrusion provided in the other member, protruding from a surface orthogonal to the orthogonal direction, and guided in the guide hole or groove.

10. The part according to claim 1, wherein a hooking prevention portion configured to prevent a first member side end portion of the engagement portion from being hooked is provided.

11. The part according to claim 10, wherein a height of the hooking prevention portion in a location facing the second coupling portion, is higher than a height of the hooking prevention portion in a location facing the first coupling portion.

12. A cooling device comprising:
a duct for blowing air to a sheet conveyance path, wherein
the part according to claim 1 is used as the duct.

13. An image forming apparatus comprising:
an image recording unit configured to record an image on a sheet;
a fixing unit configured to fix the image on the sheet, the image having been recorded by the image recording unit; and
a cooling unit configured to cool the sheet sent out from the fixing unit,
wherein the cooling device according to claim 12 is used as the cooling unit.

14. A part comprising:
a first member; and
a second member, wherein
the second member includes an engagement portion engaging with an engagement protrusion of the first member and restricting separation of the first member in a predetermined direction with respect to the second member,
the engagement portion includes:
a facing portion facing the engagement protrusion from downstream in a separating direction of the first member with respect to the second member;
a first coupling portion connected to one end of the facing portion and coupling a main body of the second member and the facing portion to each other; and
a second coupling portion connected to the other end of the facing portion and coupling the main body and the facing portion to each other, and
the second coupling portion includes an escape portion in which the engagement protrusion is movable in the separating direction and an orthogonal direction to the separating direction,
wherein the part includes a guide portion configured to guide the second member when the second member is moved in the orthogonal direction relatively to the first member to cause the facing portion to face the engagement protrusion.

* * * * *